(12) United States Patent
Matsuyama et al.

(10) Patent No.: US 11,348,604 B2
(45) Date of Patent: May 31, 2022

(54) MAGNETIC RECORDING AND REPRODUCING DEVICE

(71) Applicant: FUJIFILM Corporation, Tokyo (JP)

(72) Inventors: So Matsuyama, Kanagawa (JP); Norihito Kasada, Kanagawa (JP); Takuto Kurokawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/338,688

(22) Filed: Jun. 4, 2021

(65) Prior Publication Data

US 2021/0398555 A1 Dec. 23, 2021

(30) Foreign Application Priority Data

| Jun. 5, 2020 | (JP) | JP2020-098438 |
| Dec. 25, 2020 | (JP) | JP2020-217582 |

(51) Int. Cl.

| G11B 5/78 | (2006.01) |
| G11B 5/31 | (2006.01) |
| G11B 5/706 | (2006.01) |
| G11B 5/02 | (2006.01) |
| G11B 5/735 | (2006.01) |
| G11B 5/714 | (2006.01) |

(52) U.S. Cl.
CPC ............ *G11B 5/3116* (2013.01); *G11B 5/02* (2013.01); *G11B 5/70678* (2013.01); *G11B 5/714* (2013.01); *G11B 5/7356* (2019.05)

(58) Field of Classification Search
CPC ..... G11B 5/3116; G11B 5/7356; G11B 5/714; G11B 5/70678; G11B 5/78; G11B 5/1871; G11B 5/70; G11B 5/7022; G11B 5/7028; G11B 5/7085; G11B 5/71; G11B 5/735
USPC .................................... 360/59, 328
See application file for complete search history.

(56) References Cited

U.S. PATENT DOCUMENTS 10,403,317 B2   9/2019   Kasada et al.

FOREIGN PATENT DOCUMENTS

| JP | 2011187129 | * | 9/2011 | ............... G11B 5/78 |
| JP | 2018170058 | | 11/2018 | |

* cited by examiner

*Primary Examiner* — Nabil Z Hindi
(74) *Attorney, Agent, or Firm* — Sughrue Mion, PLLC

(57) ABSTRACT

The magnetic recording and reproducing device includes a magnetic recording medium, a recording element, and a reproducing element. The recording element is an inductive recording element having a first magnetic pole which generates a magnetic field, and a second magnetic pole which is spaced apart from the first magnetic pole with a write gap interposed therebetween, a tip width of the first magnetic pole is substantially the same as a tip width of the second magnetic pole, and a reproducing element width of the reproducing element is 0.5 μm to 0.8 μm. The magnetic recording medium has a non-magnetic support, and a magnetic layer containing a ferromagnetic powder, and the number of recesses, which are present in a surface of the magnetic layer and have an equivalent circle diameter of 0.20 μm to 0.50 μm, is 10 to 500 per area of 40 μm×40 μm.

11 Claims, 2 Drawing Sheets

MAGNETIC RECORDING AND REPRODUCING DEVICE

CROSS-REFERENCE TO RELATED APPLICATIONS

This application claims priority under 35 U.S.C 119 to Japanese Patent Application No. 2020-098438 filed on Jun. 5, 2020 and Japanese Patent Application No. 2020-217582 filed on Dec. 25, 2020. Each of the above applications is hereby expressly incorporated by reference, in its entirety, into the present application.

BACKGROUND OF THE INVENTION

1. Field of the Invention

The present invention relates to a magnetic recording and reproducing device.

2. Description of the Related Art

As one of methods for recording data on a recording medium, magnetic recording can be mentioned (see, for example, JP2018-170058A).

SUMMARY OF THE INVENTION

In the magnetic recording, data recording is performed by magnetically writing data on a magnetic layer of a magnetic recording medium using a recording element. Data reproduction is performed by magnetically reading the data, which are recorded as described above, using a reproducing element.

With an enormous increase in the quantity of information in recent years, a magnetic recording medium is required to have a higher recording capacity (higher capacity). Examples of a means for increasing the capacity include increasing recording density of data recorded on the magnetic recording medium. However, as the recording density is increased, a bit error rate tends to be increased due to shifting (off-track) of the reproducing element from the center of a recording track to be reproduced in a case where the data are reproduced by the reproducing element. In a case where a distance in which the reproducing element is shifted from the center of the recording track to be reproduced is referred to as an "off-track quantity", and an off-track quantity which allows reproduction at a low bit error rate is referred to as an "off-track margin", a larger off-track margin is desirable from a viewpoint of improving reproduction quality in a case of reproducing data recorded with high density. Regarding "off-track margin characteristics" described below, it is assumed that the larger the off-track margin, the better such characteristics.

In light of the aforementioned matters, an object of one aspect of the present invention is to provide a novel unit for enabling data reproduction with favorable off-track margin characteristics.

One aspect of the present invention relates to a magnetic recording and reproducing device comprising:
a magnetic recording medium;
a recording element; and
a reproducing element,
in which the recording element is an inductive recording element having a first magnetic pole which generates a magnetic field, and a second magnetic pole which is spaced apart from the first magnetic pole with a write gap interposed therebetween,
a tip width of the first magnetic pole is substantially the same as a tip width of the second magnetic pole,
a reproducing element width of the reproducing element is 0.5 µm to 0.8 µm,
the magnetic recording medium has a non-magnetic support, and a magnetic layer containing a ferromagnetic powder, and
the number of recesses, which are present in a surface of the magnetic layer and have an equivalent circle diameter of 0.20 µm to 0.50 µm, is 10 to 500 per area of 40 µm×40 µm.

In one embodiment, the number of bright regions (hereinafter, also referred to as "bright regions having an equivalent circle diameter of 100 nm or greater and less than 150 nm", or simply "bright regions") having an equivalent circle diameter of 100 nm or greater and less than 150 nm may be 1,000 to 5,000 in a binarized image of a secondary electron image obtained by imaging the surface of the magnetic layer with a scanning electron microscope at an acceleration voltage of 5 kV.

In one embodiment, a total thickness of the magnetic recording medium may be 5.2 µm or less.

In one embodiment, the magnetic recording medium may further have a non-magnetic layer which contains a non-magnetic powder and is provided between the non-magnetic support and the magnetic layer.

In one embodiment, the magnetic recording medium may further have a back coating layer which contains a non-magnetic powder and is provided on a surface side of the non-magnetic support opposite to a surface side on which the magnetic layer is provided.

In one embodiment, the non-magnetic powder of the back coating layer may include carbon black.

In one embodiment, the ferromagnetic powder may be a hexagonal barium ferrite powder.

In one embodiment, the ferromagnetic powder may be a hexagonal strontium ferrite powder.

In one embodiment, the ferromagnetic powder may be an ε-iron oxide powder.

In one embodiment, the magnetic recording medium may be a magnetic tape.

According to one aspect of the present invention, it is possible to provide a magnetic recording and reproducing device capable of data reproduction with favorable off-track margin characteristics.

DESCRIPTION OF THE PREFERRED EMBODIMENTS

Figure 1:
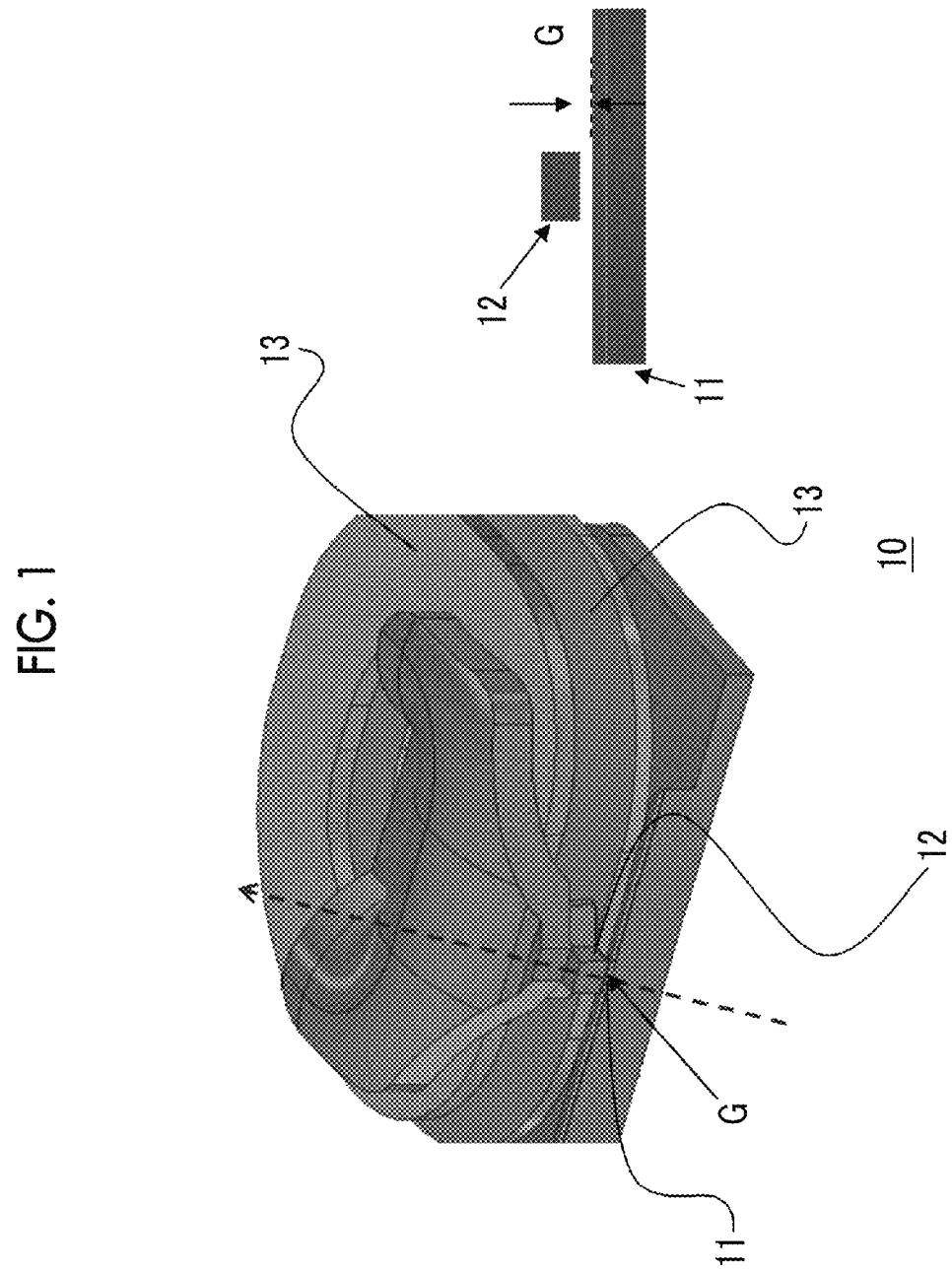
FIG. 1 is a partially enlarged view of an example of a recording element, which is processed so that a tip width of a first magnetic pole is substantially the same as a tip width of a second magnetic pole.

An embodiment of the present invention relates to a magnetic recording and reproducing device including a magnetic recording medium, a recording element, and a reproducing element.

Hereinafter, the details of the magnetic recording and reproducing device will be described.

The magnetic recording and reproducing device is generally referred to as a drive. The magnetic recording and reproducing device can be a sliding-type magnetic recording and reproducing device. The sliding-type magnetic recording and reproducing device is a device in which a surface of a magnetic layer and a magnetic head come into contact with each other and slide, in a case of performing recording of data onto the magnetic recording medium and/or reproducing of the recorded data. The magnetic recording and reproducing device generally includes one or more magnetic heads comprising an element for data. Here, the "element for data" is used as a generic term for an element for recording data and an element for reproducing data. In the present invention and the present specification, the "recording element" refers to an element for recording data, and the "reproducing element" refers to an element for reproducing data. Furthermore, the magnetic recording and reproducing device can attachably and detachably include the magnetic recording medium.

Magnetic Head

In the one form, the magnetic recording and reproducing device may include the recording element and the reproducing element in the same magnetic head. In another form, the recording element and the reproducing element may be included in separate magnetic heads, respectively. Moreover, the magnetic head including the recording element and/or the reproducing element may include a servo signal reading element. Alternatively, as a magnetic head different from the magnetic head including the recording element and/or the reproducing element, a magnetic head (servo head) comprising a servo signal reading element may be included in the magnetic recording and reproducing device. For example, the magnetic head (hereinafter, also referred to as a "recording and reproducing head") including the recording element and/or the reproducing element can include two servo signal reading elements, and each of the two servo signal reading elements can read two adjacent servo bands at the same time. One or a plurality of elements for data can also be disposed between the two servo signal reading elements. The numbers of the respective elements included in the magnetic head and the disposition of the respective elements in the magnetic head can be determined according to the standard of the magnetic recording and reproducing device.

Recording Element

The magnetic recording and reproducing device includes an inductive recording element having a first magnetic pole which generates a magnetic field, and a second magnetic pole which is spaced apart from the first magnetic pole with a write gap interposed therebetween. The inductive recording element is also generally referred to as an electromagnetic inductive recording element or a magnetic inductive recording element. In the inductive recording element, a current is caused to flow through a coil to generate a leakage magnetic field from a gap portion (write gap) of a head core, and a magnetization region is formed (that is, data are recorded) in the magnetic layer of the magnetic recording medium by this leakage magnetic field. In the recording element included in the magnetic recording and reproducing device, a tip width of the first magnetic pole is substantially the same as a tip width of the second magnetic pole. Meanwhile, in an inductive recording element mounted in a magnetic recording and reproducing device currently distributed in the market, the tip width of the first magnetic pole is wider than the tip width of the second magnetic pole. Compared to such an inductive recording element, in the inductive recording element in which the tip width of the first magnetic pole is substantially the same as the tip width of the second magnetic pole, a leakage magnetic field from an end of the magnetic pole is reduced, which makes it possible to reduce distortion of a magnetized state at an end of a recording track, and as a result, it is inferred that an effective width of the recording track can be increased. The present inventors have thought that this phenomenon can contribute to achieving favorable off-track margin characteristics.

Hereinafter, the recording element will be described in more detail with reference to the drawings. However, the form shown in the drawings is an example, and the recording element included in the magnetic recording and reproducing device is not limited to the illustrated form.

FIG. 1 is a partially enlarged view of an example of a recording element, which is processed so that a tip width of a first magnetic pole is substantially the same as a tip width of a second magnetic pole. In FIG. 1, a further partially enlarged view of the left view is the right view. In the left view of FIG. 1, the dotted arrow indicates a running direction of the magnetic recording medium in a case where data are recorded on the magnetic recording medium. A recording element 10 shown in FIG. 1 includes a first magnetic pole 11, a second magnetic pole 12, and a coil 13. The second magnetic pole 12 is spaced apart from the first magnetic pole 11 with a write gap G interposed therebetween.

The first magnetic pole 11 is a magnetic pole generally referred to as a leading-side magnetic pole, and is a magnetic pole generating a magnetic field. The magnetic field generated from the first magnetic pole leaks from the write gap to be a leakage magnetic field, and data recording onto the magnetic recording medium is performed by this leakage magnetic field.

By causing a current to flow through the coil 13, a magnetic flux can flow through the first magnetic pole 11 to generate a magnetic field.

The second magnetic pole 12 is a magnetic pole generally referred to as a trailing-side magnetic pole, and is a magnetic pole which closes a magnetic path between the magnetic pole and the magnetic recording medium.

Figure 2:
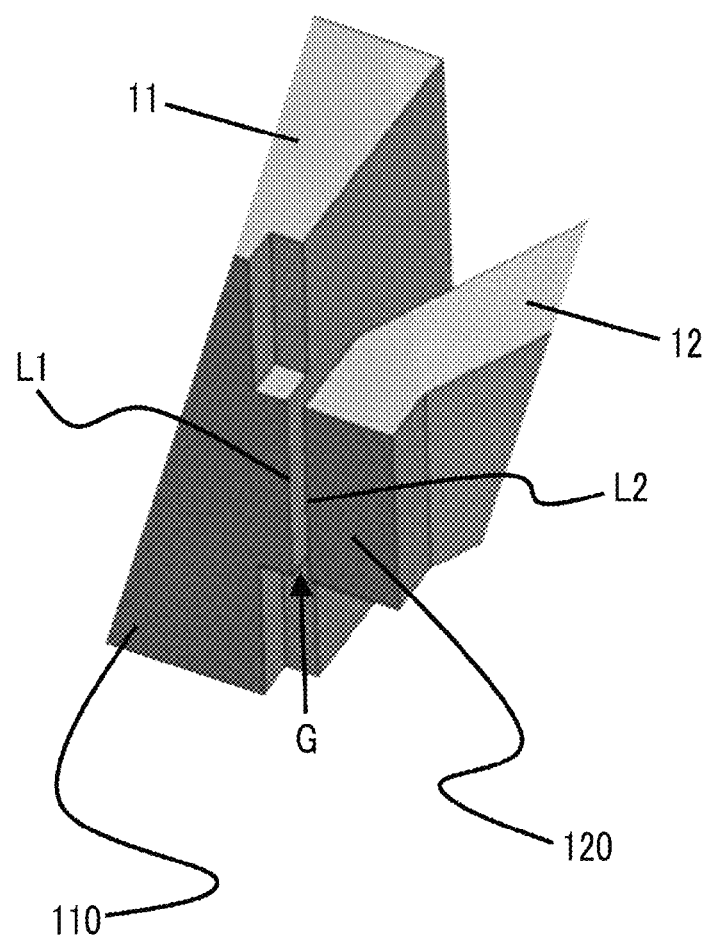
FIG. 2 is a schematic view showing a configuration of a tip on a write gap side of a recording element 10 shown in FIG. 1, which has been processed so that the tip width of the first magnetic pole is substantially the same as the tip width of the second magnetic pole.

FIG. 2 is a schematic view showing a configuration of a tip on the write gap side of the recording element 10 shown in FIG. 1, which has been processed so that the tip width of the first magnetic pole is substantially the same as the tip width of the second magnetic pole. The first magnetic pole 11 has a surface 110 which serves as a sliding surface with the magnetic recording medium during the data recording. The second magnetic pole 12 has a surface 120 which serves as a sliding surface with the magnetic recording medium during the data recording.

In the present invention and the present specification, the "tip width" of the first magnetic pole refers to a length of a write gap-side endmost side of the surface, which serves as the sliding surface with the magnetic recording medium during the data recording, in the first magnetic pole. In the example shown in FIG. 2, L1 is such a write gap-side endmost side. The "tip width" of the second magnetic pole refers to a length of a write gap-side endmost side of the surface, which serves as the sliding surface with the magnetic recording medium during the data recording, in the second magnetic pole. In the example shown in FIG. 2, L2 is such a write gap-side endmost side. In a case where the tip width of the first magnetic pole is defined as W1, and the tip width of the second magnetic pole is defined as W2, the fact in which the tip width of the first magnetic pole is "substantially the same as" the tip width of the second magnetic pole means that W1 is in a range of "W2×0.9 to W2×1.1". Furthermore, the write gap-side endmost side may be an endmost side of an angular end, as in the example shown in FIG. 2, or may be an endmost side of a rounded end formed, for example, by being subjected to chamfering processing or the like.

The recording element in which the tip width of the first magnetic pole is substantially the same as the tip width of the second magnetic pole can be produced by performing trimming processing on a tip of a first magnetic pole of an available recording element such as a recording element mounted in a commercially available magnetic recording and reproducing device, and a recording element mounted in a commercially available magnetic head. Alternatively, by performing trimming processing on a tip of a first magnetic pole of a recording element produced using a well-known method, the tip width of the first magnetic pole can also be made substantially the same as the tip width of the second magnetic pole. The trimming processing can be performed by a well-known method such as using an ion beam.

The recording element included in the magnetic recording and reproducing device may have the same configuration as a well-known inductive recording element, except that the recording element has the aforementioned configuration. Regarding the configuration of the well-known inductive recording element, FIG. 1 to FIG. 6 of US2011/0273797A1, the descriptions of these drawings, and the like can be referred to, for example.

Reproducing Element

The magnetic recording and reproducing device includes a reproducing element having a reproducing element width of 0.5 µm to 0.8 µm. In the present invention and the present specification, the "reproducing element width" refers to a physical dimension of a reproducing element width. Such a physical dimension can be measured with an optical microscope, a scanning electron microscope, or the like. The reproducing element having a narrow reproducing element width is less likely to be protruded from the recording track to be reproduced, and thus can contribute to achieving favorable off-track margin characteristics in a combination with a magnetic recording medium having a magnetic layer in which recesses are present in a state which will be described later in detail. In this regard, the reproducing element width is 0.8 µm or less, and preferably 0.7 µm or less. Moreover, from a viewpoint of enabling data reproduction with favorable off-track margin characteristics in a combination with a magnetic recording medium having a magnetic layer in which recesses are present in a state which will be described later in detail, the reproducing element width of the reproducing element is 0.5 µm or greater, and preferably 0.6 µm or greater.

The reproducing element included in the magnetic recording and reproducing device may have a configuration of a well-known reproducing element, except that the reproducing element width is 0.5 µm to 0.8 µm. As the reproducing element, a magnetoresistive (MR) element capable of reading data recorded on the magnetic recording medium with excellent sensitivity is preferable. As the MR element, various MR elements such as an anisotropic magnetoresistive (AMR) element, a giant magnetoresistive (GMR) element, and a tunnel magnetoresistive (TMR) element can be mentioned.

Magnetic Recording Medium

The magnetic recording and reproducing device includes a magnetic recording medium which has a non-magnetic support, and a magnetic layer containing a ferromagnetic powder, and in which the number of recesses, which are present in a surface of the magnetic layer and have an equivalent circle diameter of 0.20 µm to 0.50 µm, is 10 to 500 per area of 40 µm×40 µm.

Presence State of Recesses on Surface of Magnetic Layer

In the present invention and the present specification, the number of recesses, which are present in the surface of the magnetic layer and have an equivalent circle diameter of 0.20 µm to 0.50 µm, is obtained by performing measurement on the surface of the magnetic layer of the magnetic recording medium using an atomic force microscope (AFM) as follows. In the present invention and the present specification, the "surface of the magnetic layer" has the same meaning as the surface of the magnetic recording medium on the magnetic layer side. The number of recesses (per area of 40 µm×40 µm), as obtained as follows, which are present in the surface of the magnetic layer and have an equivalent circle diameter of 0.20 µm to 0.50 µm is also referred to as "the number of recesses having an equivalent circle diameter within the above range", or simply "the number of recesses".

The measurement region is taken as a randomly selected region of 40 µm square (40 µm×40 µm) on the surface of the magnetic layer. The measurement is performed for three different measurement spots on the surface of the magnetic layer (n=3). An arithmetic mean of the three measurement results obtained by such measurement is taken as the number of recesses which are present in the surface of the magnetic layer of the magnetic recording medium to be measured and have an equivalent circle diameter of 0.20 µm to 0.50 µm. In a plane image of the surface of the magnetic layer obtained using the AFM, a surface in the measurement region where volumes of a convex component and a concave component are equal is defined as a reference surface, and a portion detected as a portion recessed from this reference surface is specified as a "recess". Among the portions specified as "recesses", there may be recesses in which a part is inside the measurement region and the other part is outside the measurement region. In a case of obtaining the number of recesses, the number of recesses including such recesses is measured. In the plane image of the surface of the magnetic layer obtained using the AFM, an area (hereinafter, an "area A") of the portion specified as a recess is measured, and an equivalent circle diameter L is calculated by $(A/\pi)\bigcirc(\frac{1}{2}) \times 2 = L$. Here, the operator "$\bigcirc$" represents a power. The equivalent circle diameter is obtained in increments of 0.01 µm by obtaining the equivalent circle diameter as a value in a unit of µm, rounding off the value to three decimal places, and rounding down four and subsequent decimal places. As an example of the measurement conditions for the AFM, the following measurement conditions can be mentioned.

A region having an area of 40 µm×40 µm on the surface of the magnetic layer of the magnetic recording medium is measured by using an AFM (Nanoscope 5 manufactured by BRUKER) in a peak force tapping mode. SCANASYST-AIR manufactured by BRUKER is used as a probe, a resolution is set to 512 pixels×512 pixels, and a scan speed is set to a speed at which one screen (512 pixels×512 pixels) is measured for 512 seconds.

The number of recesses, which are present in the surface of the magnetic layer of the magnetic recording medium and have an equivalent circle diameter of 0.20 µm to 0.50 µm, is 10 to 500 per area of 40 µm×40 µm.

It is thought that in a case where a reproducing track width is narrowed by performing reproduction with a reproducing element having a reproducing element width of 0.5 µm to 0.8 µm, recesses having an equivalent circle diameter within the above range may cause defects (partial missing of a magnetic signal) during reproduction. Moreover, preventing the occurrence of defects reduces an error rate, and thus can contribute to improving the off-track margin characteristics. Furthermore, it is thought that according to the magnetic recording medium in which the number of recesses having an equivalent circle diameter within the above range is 500 or less, the occurrence of defects during reproduction can be prevented, which can contribute to achieving favorable off-track margin characteristics. In this regard, the number of recesses having an equivalent circle diameter within the above range is 500 or less, preferably 400 or less, more preferably 300 or less, and even more preferably 200 or less.

Meanwhile, it is thought that the presence of recesses having an equivalent circle diameter within the above range in the surface of the magnetic layer can contribute to preventing deterioration in the reproduction quality, which is assumed to be caused by a foreign substance referred to as debris, in a case of performing reproduction with the reproducing element having the aforementioned reproducing element width. From a viewpoint of being able to contribute to the improvement in the off-track margin characteristics by preventing the generation of debris, the number of recesses having an equivalent circle diameter within the above range is 10 or more, preferably 50 or more, and more preferably 100 or more.

The detail of an example of a method for controlling the number of recesses will be described later.

Number of Bright Regions Having Equivalent Circle Diameter of 100 nm or Greater and Less than 150 nm In one form, the number of bright regions having an equivalent circle diameter of 100 nm or greater and less than 150 nm may be 5,000 or less in a binarized image of a secondary electron image obtained by imaging the surface of the magnetic layer of the magnetic recording medium with a scanning electron microscope at an acceleration voltage of 5 kV. Moreover, in one form, the number of bright regions may be 1,000 or more.

In the present invention and the present specification, the scanning electron microscope, which is used to obtain the number of bright regions having an equivalent circle diameter of 100 nm or greater and less than 150 nm, is a field emission-scanning electron microscope (FE-SEM). As the FE-SEM, for example, FE-SEM S4800 manufactured by Hitachi, Ltd. can be used, and this FE-SEM is used in Examples which will be described later.

Furthermore, in a case of obtaining the number of bright regions, the surface of the magnetic layer is not coated before capturing the SEM image.

The imaging is performed by selecting an unimaged region on the surface of the magnetic layer.

The SEM image to be captured is a secondary electron image.

The equivalent circle diameter is obtained in increments of 1 nm by rounding off to one decimal place, and rounding down two and subsequent decimal places.

In the measurement of the number of bright regions, the bright region in which only a part is included in the binarized image and the remaining part is outside the binarized image is excluded from the measurement target.

In the present invention and the present specification, the number of bright regions is obtained by the following method.

A secondary electron image of the surface of the magnetic layer of the magnetic recording medium to be measured is captured using a scanning electron microscope (FE-SEM). As imaging conditions, an acceleration voltage is set to 5 kV, a working distance is set to 5 mm, and an imaging magnification is set to 10,000 times. In a case of performing the imaging, an unimaged region on the surface of the magnetic layer is selected, focus adjustment is performed under the aforementioned imaging conditions, and a secondary electron image is captured. A portion (micron bar, cross mark, and the like) displaying a size and the like is erased from the captured image, and a secondary electron image having the number of pixels of 960 pixels×1,280 pixels is acquired.

The aforementioned operations are performed 100 times at different spots on the surface of the magnetic layer of the magnetic recording medium to be measured.

The secondary electron images acquired as described above are taken into image processing software, and subjected to a binarization process according to the following procedure. As the image analysis software, for example, free software ImageJ can be used. By the binarization process, the image is divided into a bright region (white portion) and a dark region (black portion).

The threshold value for performing the binarization process on the secondary electron image acquired as described above is set to 210 gradations for a lower limit value and 255 gradations for an upper limit value, and the binarization process is executed by these two threshold values. After the binarization process, a noise component removal process is performed by the image analysis software. The noise component removal process can be performed by the following method, for example. In the image analysis software ImageJ, a noise cut process Despeckle is selected to remove noise components.

Regarding the binarized image obtained as described above, the number of bright regions (that is, white portions) and the area of each bright region are obtained by the image analysis software. From the area of the bright region obtained here, an equivalent circle diameter of each bright region is obtained. Specifically, an equivalent circle diameter $L$ is calculated by $(A/\pi)\bigcirc(½)\times 2=L$ from the obtained area $A$. Here, the operator "$\bigcirc$" represents a power.

The aforementioned steps are performed on the binarized images (100 images) obtained as described above.

By doing so, the number of bright regions having an equivalent circle diameter of 100 nm or greater and less than 150 nm is obtained as the total number of bright regions in the 100 images.

The present inventors have thought that setting the number of bright regions to 1,000 to 5,000 can contribute to further improving the off-track margin characteristics. The present inventors have inferred this matter as follows.

The magnetic layer is generally formed of a magnetic layer-forming composition containing one or more kinds of non-magnetic powders in addition to a ferromagnetic powder. The present inventors have thought that the number of bright regions obtained by the aforementioned method can be an index of the presence state of a non-magnetic powder (hereinafter, also referred to as an "abrasive"), which is contained in the magnetic layer, on the surface of the magnetic layer in order to impart abrasive properties to the surface of the magnetic layer.

In addition, it is thought that in a case where a reproducing track width is narrowed by performing reproduction with a reproducing element having a reproducing element width of 0.5 μm to 0.8 μm, an abrasive observed as a bright region having an equivalent circle diameter within the above range may also cause defects (partial missing of a magnetic signal) during reproduction. Moreover, preventing the occurrence of such defects further reduces an error rate, and thus can contribute to further improving the off-track margin characteristics. Furthermore, it is thought that according to the magnetic recording medium in which the number of bright regions having an equivalent circle diameter within the above range is 5,000 or less, the occurrence of defects during reproduction can be further prevented, which can contribute to achieving better off-track margin characteristics. In this regard, the number of bright regions having an equivalent circle diameter within the above range is preferably 5,000 or less, more preferably 4,000 or less, and even more preferably 3,000 or less.

Meanwhile, it is thought that the presence of an abrasive observed as a bright region having an equivalent circle diameter within the above range in the surface of the magnetic layer can contribute to further preventing deterioration in the reproduction quality, which is assumed to be caused by a foreign substance referred to as debris, in a case of performing reproduction with the reproducing element having the aforementioned reproducing element width. From a viewpoint of further improving the off-track margin characteristics by further preventing the generation of debris, the number of bright regions having an equivalent circle diameter within the above range is preferably 1,000 or more and more preferably 2,000 or more.

The detail of an example of a method for controlling the number of bright regions will be described later.

Hereinafter, the magnetic recording medium will be described in more detail.

Magnetic Layer

Ferromagnetic Powder

As the ferromagnetic powder contained in the magnetic layer, one kind of ferromagnetic powder well known as ferromagnetic powders used in magnetic layers of various magnetic recording media, or a combination of two or more kinds thereof can be used. It is preferable to use a ferromagnetic powder having a small average particle size as the ferromagnetic powder, from a viewpoint of improving recording density. From the viewpoint, the average particle size of the ferromagnetic powders is preferably 50 nm or smaller, more preferably 45 nm or smaller, even more preferably 40 nm or smaller, still preferably 35 nm or smaller, still more preferably 30 nm or smaller, still even more preferably 25 nm or smaller, and further preferably 20 nm or smaller. Meanwhile, from a viewpoint of magnetization stability, the average particle size of the ferromagnetic powders is preferably 5 nm or larger, more preferably 8 nm or larger, even more preferably 10 nm or larger, still preferably 15 nm or larger, and still more preferably 20 nm or larger.

Hexagonal Ferrite Powder

As a preferred specific example of the ferromagnetic powder, a hexagonal ferrite powder can be mentioned. For details of the hexagonal ferrite powder, the descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the present invention and the present specification, the "hexagonal ferrite powder" refers to a ferromagnetic powder in which a hexagonal ferrite-type crystal structure is detected as a main phase by X-ray diffraction analysis. The main phase refers to a structure to which a diffraction peak of the highest intensity in an X-ray diffraction spectrum obtained by the X-ray diffraction analysis belongs. For example, in a case where the diffraction peak of the highest intensity in the X-ray diffraction spectrum obtained by the X-ray diffraction analysis belongs to a hexagonal ferrite-type crystal structure, it is determined that the hexagonal ferrite-type crystal structure is detected as a main phase. In a case where only a single structure is detected by the X-ray diffraction analysis, this detected structure is used as a main phase. The hexagonal ferrite-type crystal structure includes at least an iron atom, a divalent metal atom, and an oxygen atom as constituting atoms. The divalent metal atom is a metal atom which can be a divalent cation as an ion, and examples thereof include an alkaline earth metal atom such as a strontium atom, a barium atom, or a calcium atom, and a lead atom. In the present invention and the present specification, the hexagonal strontium ferrite powder refers to a powder in which a main divalent metal atom contained in this powder is a strontium atom, and the hexagonal barium ferrite powder refers to a powder in which a main divalent metal atom contained in this powder is a barium atom. The main divalent metal atom refers to a divalent metal atom occupying the largest part based on atom %, among the divalent metal atoms contained in the powder. Here, the aforementioned divalent metal atom does not include a rare earth atom. The "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is one form of the hexagonal ferrite powder, will be described in more detail.

An activation volume of the hexagonal strontium ferrite powder is preferably in a range of 800 to 1,600 $nm^3$. The atomized hexagonal strontium ferrite powder having an activation volume within the above range is suitable for producing a magnetic recording medium exhibiting excellent electromagnetic conversion characteristics. The activation volume of the hexagonal strontium ferrite powder is preferably 800 $nm^3$ or greater, and can also be, for example, 850 $nm^3$ or greater. Moreover, from a viewpoint of further improving the electromagnetic conversion characteristics, the activation volume of the hexagonal strontium ferrite powder is more preferably 1,500 $nm^3$ or less, even more preferably 1,400 $nm^3$ or less, still preferably 1,300 $nm^3$ or less, still more preferably 1,200 $nm^3$ or less, and still even more preferably 1,100 $nm^3$ or less. The same also applies to an activation volume of the hexagonal barium ferrite powder.

The "activation volume" is a unit of magnetization reversal, and is an index indicating a magnetic size of a particle. The activation volume and an anisotropy constant Ku, which will be described later, described in the present invention and the present specification are values obtained from the following relational expression between a coercivity Hc and an activation volume V, after magnetic field sweep rates of a Hc measurement part at time points of 3 minutes and 30 minutes are measured by using a vibrating sample magnetometer (measurement temperature: 23° C.±1° C.). Moreover, regarding a unit of the anisotropy constant Ku, 1 erg/cc=$1.0 \times 10^{-1}$ $J/m^3$.

$$Hc = 2Ku/Ms\{1 - [(kT/KuV)\ln(At/0.693)]^{1/2}\}$$

[In the expression, Ku: anisotropy constant (unit: $J/m^3$), Ms: saturation magnetization (unit: kA/m), k: Boltzmann's constant, T: absolute temperature (unit: K), V: activation volume (unit: cm³), A: spin precession frequency (unit: s⁻¹), and t: magnetic field reversal time (unit: s)]

The anisotropy constant Ku can be used as an index of reduction of thermal fluctuation, that is, improvement in thermal stability. The hexagonal strontium ferrite powder can preferably have a Ku of $1.8 \times 10^5$ J/m³ or greater, and more preferably have a Ku of $2.0 \times 10^5$ J/m³ or greater. Moreover, the Ku of the hexagonal strontium ferrite powder can be, for example, $2.5 \times 10^5$ J/m³ or less. However, since a higher Ku means higher thermal stability and thus is preferable, the Ku is not limited to the value exemplified above.

The hexagonal strontium ferrite powder may or may not contain a rare earth atom. In a case where the hexagonal strontium ferrite powder contains the rare earth atom, a content ratio (bulk content ratio) of the rare earth atom is preferably 0.5 to 5.0 atom % with respect to 100 atom % of the iron atom. In one form, the hexagonal strontium ferrite powder containing the rare earth atom can have rare earth atomic uneven distribution in the surface layer portion. The "rare earth atomic uneven distribution in the surface layer portion" in the present invention and the present specification means that a content ratio (hereinafter, referred to as a "rare earth atom content ratio in the surface layer portion", or simply a "content ratio in the surface layer portion" regarding the rare earth atom) of the rare earth atom with respect to 100 atom % of an iron atom in a solution obtained by partially dissolving the hexagonal strontium ferrite powder with acid and a content ratio (hereinafter, referred to as a "rare earth atom bulk content ratio", or simply a "bulk content ratio" regarding the rare earth atom) of the rare earth atom with respect to 100 atom % of an iron atom in a solution obtained by totally dissolving the hexagonal strontium ferrite powder with acid satisfy a ratio of rare earth atom content ratio in the surface layer portion/rare earth atom bulk content ratio>1.0. The content ratio of the rare earth atom of the hexagonal strontium ferrite powder, which will be described later, has the same meaning as the rare earth atom bulk content ratio. In contrast, the partial dissolving using acid is to dissolve the surface layer portions of particles constituting the hexagonal strontium ferrite powder, and accordingly, the content ratio of the rare earth atom in the solution obtained by the partial dissolving is the content ratio of the rare earth atom in the surface layer portions of the particles constituting the hexagonal strontium ferrite powder. The fact in which the rare earth atom content ratio in the surface layer portion satisfies a ratio of "rare earth atom content ratio in the surface layer portion/rare earth atom bulk content ratio>1.0" means that the rare earth atoms are unevenly distributed in the surface layer portion (that is, a larger amount of the rare earth atoms is present, compared to that inside) in the particles constituting the hexagonal strontium ferrite powder. The surface layer portion in the present invention and the present specification means a partial region of the particles constituting the hexagonal strontium ferrite powder towards the inside from the surface.

In a case where the hexagonal strontium ferrite powder contains the rare earth atom, a content ratio (bulk content ratio) of the rare earth atom is preferably in a range of 0.5 to 5.0 atom % with respect to 100 atom % of the iron atom. It is thought that the fact in which the rare earth atom is contained in a bulk content ratio within the above range and the rare earth atoms are unevenly distributed in the surface layer portions of the particles constituting the hexagonal strontium ferrite powder contribute to preventing reduction of reproduction output during the repeated reproduction. It is inferred that this is because the anisotropy constant Ku can be increased due to the hexagonal strontium ferrite powder containing the rare earth atom in a bulk content ratio within the above range and uneven distribution of the rare earth atoms in the surface layer portions of the particles constituting the hexagonal strontium ferrite powder. As the value of the anisotropy constant Ku is high, the occurrence of a phenomenon, which is referred to as so-called thermal fluctuation, can be prevented (that is, thermal stability can be improved). By preventing the occurrence of thermal fluctuation, it is possible to prevent reduction of the reproduction output during the repeated reproduction. It is inferred that the uneven distribution of the rare earth atom in the surface layer portion of the particle of the hexagonal strontium ferrite powder contributes to stabilizing a spin at an iron (Fe) site in a crystal lattice of the surface layer portion, thereby increasing the anisotropy constant Ku.

In addition, it is inferred that the use of the hexagonal strontium ferrite powder having the rare earth atomic uneven distribution in the surface layer portion as the ferromagnetic powder of the magnetic layer also contributes to preventing scraping of the surface of the magnetic layer due to the sliding with the magnetic head. That is, it is inferred that the hexagonal strontium ferrite powder having the rare earth atomic uneven distribution in the surface layer portion can also contribute to the improvement in running durability of the magnetic recording medium. It is inferred that this is because the uneven distribution of the rare earth atoms on the surfaces of the particles constituting the hexagonal strontium ferrite powder contributes to improvement in an interaction between the surface of the particles and an organic substance (for example, binding agent and/or additive) contained in the magnetic layer, thereby improving the hardness of the magnetic layer.

From a viewpoint of further preventing reduction of the reproduction output in the repeated reproduction and/or a viewpoint of further improving running durability, the content ratio (bulk content ratio) of the rare earth atom is more preferably in a range of 0.5 to 4.5 atom %, even more preferably in a range of 1.0 to 4.5 atom %, and still preferably in a range of 1.5 to 4.5 atom %.

The bulk content ratio is a content ratio obtained by totally dissolving the hexagonal strontium ferrite powder. Moreover, in the present invention and the present specification, the content ratio of the atom refers to a bulk content ratio obtained by totally dissolving the hexagonal strontium ferrite powder, unless otherwise noted. The hexagonal strontium ferrite powder containing the rare earth atom may contain only one kind of rare earth atom or may contain two or more kinds of rare earth atoms, as the rare earth atom. In a case where two or more kinds of rare earth atoms are contained, the bulk content ratio is obtained for the total of the two or more kinds of rare earth atoms. The above matter is also true of other components in the present invention and the present specification. That is, for a given component, only one kind thereof may be used or two or more kinds thereof may be used, unless otherwise noted. In a case where two or more kinds thereof are used, the content or content ratio is a content or content ratio of the total of the two or more kinds thereof.

In a case where the hexagonal strontium ferrite powder contains the rare earth atom, the rare earth atom contained therein may be any one or more kinds of the rare earth atoms. Examples of the rare earth atom, which is preferable from a viewpoint of further preventing reduction of the reproduction output during the repeated reproduction, include a neodymium atom, a samarium atom, an yttrium atom, and a dysprosium atom, a neodymium atom, a samarium atom, and an yttrium atom are more preferable, and a neodymium atom is even more preferable.

In the hexagonal strontium ferrite powder having the rare earth atomic uneven distribution in the surface layer portion, the rare earth atoms may be unevenly distributed in the surface layer portions of the particles constituting the hexagonal strontium ferrite powder, and a degree of the uneven distribution is not limited. For example, regarding the hexagonal strontium ferrite powder having the rare earth atomic uneven distribution in the surface layer portion, "content ratio in the surface layer portion/bulk content ratio", which is a ratio of the content ratio in the surface layer portion of the rare earth atom obtained by partial dissolving performed under the dissolving conditions which will be described later to the bulk content ratio of the rare earth atom obtained by total dissolving performed under the dissolving conditions which will be described later, is greater than 1.0 and can be 1.5 or greater. The "content ratio in the surface layer portion/bulk content ratio" of greater than 1.0 means that the rare earth atoms are unevenly distributed in the surface layer portions (that is, a larger amount of the rare earth atoms is present, compared to that inside) in the particles constituting the hexagonal strontium ferrite powder. Furthermore, "content ratio in the surface layer portion/bulk content ratio", which is the ratio of the content ratio in the surface layer portion of the rare earth atom obtained by partial dissolving performed under the dissolving conditions which will be described later to the bulk content ratio of the rare earth atom obtained by total dissolving performed under the dissolving conditions which will be described later, can be, for example, 10.0 or less, 9.0 or less, 8.0 or less, 7.0 or less, 6.0 or less, 5.0 or less, or 4.0 or less. However, in the hexagonal strontium ferrite powder having the rare earth atomic uneven distribution in the surface layer portion, the rare earth atoms may be unevenly distributed in the surface layer portions of the particles constituting the hexagonal strontium ferrite powder, and the "content ratio in the surface layer portion/bulk content ratio" is not limited to the exemplified upper limit or lower limit.

The partial dissolving and the total dissolving of the hexagonal strontium ferrite powder will be described below. Regarding the hexagonal strontium ferrite powder present as a powder, sample powders for the partial dissolving and the total dissolving are collected from the powders of the same lot. Meanwhile, regarding the hexagonal strontium ferrite powder contained in the magnetic layer of the magnetic recording medium, a part of the hexagonal strontium ferrite powders extracted from the magnetic layer is subjected to the partial dissolving and the other part is subjected to the total dissolving. The extraction of the hexagonal strontium ferrite powder from the magnetic layer can be performed, for example, by the method described in paragraph 0032 of JP2015-091747A.

The partial dissolving refers to dissolving performed so that the hexagonal strontium ferrite powder remaining in the solution can be visually confirmed at the time of the completion of the dissolving. For example, by performing the partial dissolving, 10% to 20% by mass of the region of the particles constituting the hexagonal strontium ferrite powder with respect to 100% by mass of the all particles can be dissolved. On the other hand, the total dissolving refers to dissolving performed until the hexagonal strontium ferrite powder remaining in the solution is not visually confirmed at the time of the completion of the dissolving.

The partial dissolving and the measurement of the content ratio in the surface layer portion are, for example, performed by the following method. However, the following dissolving conditions such as an amount of a sample powder are merely examples, and dissolving conditions capable of performing the partial dissolving and the total dissolving can be randomly used.

A vessel (for example, a beaker) containing 12 mg of a sample powder and 10 mL of hydrochloric acid having a concentration of 1 mol/L is held on a hot plate at a set temperature of 70° C. for 1 hour. The obtained solution is filtered with a membrane filter of 0.1 μm. The element analysis of the filtrate obtained as described above is performed by an inductively coupled plasma (ICP) analysis device. By doing so, the content ratio in the surface layer portion of the rare earth atom with respect to 100 atom % of the iron atom can be obtained. In a case where a plurality of kinds of rare earth atoms are detected through the element analysis, a total content ratio of all the rare earth atoms is taken as the content ratio in the surface layer portion. The above matter is also true of the measurement of the bulk content ratio.

Meanwhile, the total dissolving and the measurement of the bulk content ratio are, for example, performed by the following method.

A vessel (for example, a beaker) containing 12 mg of a sample powder and 10 mL of hydrochloric acid having a concentration of 4 mol/L is held on a hot plate at a set temperature of 80° C. for 3 hours. Thereafter, the bulk content ratio with respect to 100 atom % of the iron atom can be obtained by performing the processes in the same manner as in the partial dissolving and the measurement of the content ratio in the surface layer portion.

From a viewpoint of increasing reproducing output in a case of reproducing data recorded on a magnetic recording medium, it is desirable that a mass magnetization σs of the ferromagnetic powder contained in the magnetic recording medium is high. In regards to this matter, in a hexagonal strontium ferrite powder which contains a rare earth atom but does not have rare earth atomic uneven distribution in the surface layer portion, the σs tends to be significantly decreased, compared to that in a hexagonal strontium ferrite powder not containing the rare earth atom. With respect to this, it is thought that the hexagonal strontium ferrite powder having the rare earth atomic uneven distribution in the surface layer portion is preferable for preventing such a significant decrease in the σs. In one form, the σs of the hexagonal strontium ferrite powder can be 45 A·m$^2$/kg or greater and can also be 47 A·m$^2$/kg or greater. Meanwhile, from a viewpoint of noise reduction, the as is preferably 80 A·m$^2$/kg or less and more preferably 60 A·m$^2$/kg or less. The σs can be measured by using a well-known measurement device capable of measuring magnetic characteristics, such as a vibrating sample magnetometer. In the present invention and the present specification, the mass magnetization σs is taken as a value measured at a magnetic field strength of 15 kOe, unless otherwise noted. 1[kOe] is $10^6/4\pi$[A/m].

Regarding the content ratio (bulk content ratio) of the constituting atoms in the hexagonal strontium ferrite powder, a content ratio of the strontium atom can be, for example, in a range of 2.0 to 15.0 atom % with respect to 100 atom % of the iron atom. In one form, in the hexagonal strontium ferrite powder, only a strontium atom can be used as the divalent metal atom contained in this powder. Moreover, in another form, the hexagonal strontium ferrite powder can also contain one or more kinds of other divalent metal atoms, in addition to the strontium atom. For example, a barium atom and/or a calcium atom may be contained. In a case where the other divalent metal atom other than the strontium atom is contained, a content ratio of a barium atom and a content ratio of a calcium atom in the hexagonal strontium ferrite powder can each be, for example, in a range of 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structures can be detected by the X-ray diffraction analysis. For example, in one form, in the hexagonal strontium ferrite powder, only the M-type crystal structure can be detected by the X-ray diffraction analysis. For example, the M-type hexagonal ferrite is represented by a compositional formula of $AFe_{12}O_{19}$. Here, in a case where A represents a divalent metal atom and the hexagonal strontium ferrite powder has the M-type, only a strontium atom (Sr) is used as A, or in a case where a plurality of divalent metal atoms are contained as A, the strontium atom (Sr) occupies the largest part based on atom % as described above. A content ratio of the divalent metal atom in the hexagonal strontium ferrite powder is generally determined according to the type of the crystal structure of the hexagonal ferrite and is not particularly limited. The same also applies to a content ratio of an iron atom and a content ratio of an oxygen atom. The hexagonal strontium ferrite powder at least contains an iron atom, a strontium atom, and an oxygen atom, and may further contain a rare earth atom. Moreover, the hexagonal strontium ferrite powder may or may not contain atoms other than these atoms. As an example, the hexagonal strontium ferrite powder may contain an aluminum atom (Al). A content ratio of the aluminum atom can be, for example, 0.5 to 10.0 atom % with respect to 100 atom % of the iron atom. From a viewpoint of further preventing the reduction of the reproduction output during the repeated reproduction, the hexagonal strontium ferrite powder contains the iron atom, the strontium atom, the oxygen atom, and the rare earth atom, and a content ratio of the atoms other than these atoms with respect to 100 atom % of the iron atom is preferably 10.0 atom % or less and more preferably in a range of 0 to 5.0 atom %, and may be 0 atom %. That is, in one form, the hexagonal strontium ferrite powder may not contain atoms other than the iron atom, the strontium atom, the oxygen atom, and the rare earth atom. The content ratio expressed in atom % is obtained by converting the content ratio (unit:% by mass) of each atom obtained by totally dissolving the hexagonal strontium ferrite powder into a value expressed in atom % by using the atomic weight of each atom. Furthermore, in the present invention and the present specification, the expression "not contained" for a given atom means that the content ratio thereof obtained by performing total dissolving and then measurement with an ICP analysis device is 0% by mass. A detection limit of the ICP analysis device is generally 0.01 parts per million (ppm) or less based on mass. The expression "not contained" is used to mean that a given atom is contained in an amount smaller than the detection limit of the ICP analysis device. In one form, the hexagonal strontium ferrite powder may not contain a bismuth atom (Bi).

Metal Powder

As a preferred specific example of the ferromagnetic powder, a ferromagnetic metal powder can also be mentioned. For details of the ferromagnetic metal powder, the descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be mentioned. In the present invention and the present specification, the "ε-iron oxide powder" refers to a ferromagnetic powder in which an ε-iron oxide-type crystal structure is detected as a main phase by X-ray diffraction analysis. For example, in a case where the diffraction peak of the highest intensity in the X-ray diffraction spectrum obtained by the X-ray diffraction analysis belongs to an ε-iron oxide-type crystal structure, it is determined that the ε-iron oxide-type crystal structure is detected as a main phase. As a producing method of the ε-iron oxide powder, a producing method from goethite, a reverse micelle method, and the like are known. All of the aforementioned producing methods are well known. Moreover, regarding a method for producing the ε-iron oxide powder in which a part of Fe is substituted with a substitutional atom such as Ga, Co, Ti, Al, or Rh, the descriptions disclosed in J. Jpn. Soc. Powder Metallurgy Vol. 61 Supplement, No. 51, pp. S280 to S284, J. Mater. Chem. C, 2013, 1, pp. 5,200 to 5,206, and the like can be referred to, for example. However, the producing method of the ε-iron oxide powder, which can be used as the ferromagnetic powder in the magnetic layer of the magnetic recording medium, is not limited to the method mentioned above.

An activation volume of the ε-iron oxide powder is preferably in a range of 300 to 1,500 $nm^3$. The atomized ε-iron oxide powder having an activation volume within the above range is suitable for producing a magnetic recording medium exhibiting excellent electromagnetic conversion characteristics. The activation volume of the ε-iron oxide powder is preferably 300 $nm^3$ or greater, and can also be, for example, 500 $nm^3$ or greater. Moreover, from a viewpoint of further improving the electromagnetic conversion characteristics, the activation volume of the ε-iron oxide powder is more preferably 1,400 $nm^3$ or less, even more preferably 1,300 $nm^3$ or less, still preferably 1,200 $nm^3$ or less, and still more preferably 1,100 $nm^3$ or less.

The anisotropy constant Ku can be used as an index of reduction of thermal fluctuation, that is, improvement in thermal stability. The ε-iron oxide powder can preferably have a Ku of $3.0 \times 10^4$ $J/m^3$ or greater, and more preferably have a Ku of $8.0 \times 10^4$ $J/m^3$ or greater. Moreover, the Ku of the ε-iron oxide powder can be, for example, $3.0 \times 10^5$ $J/m^3$ or less. However, since a higher Ku means higher thermal stability and thus is preferable, the Ku is not limited to the value exemplified above.

From a viewpoint of increasing reproducing output in a case of reproducing data recorded on a magnetic recording medium, it is desirable that a mass magnetization as of the ferromagnetic powder contained in the magnetic recording medium is high. In regards to this matter, in one form, the as of the ε-iron oxide powder can be 8 $A \cdot m^2/kg$ or greater and can also be 12 $A \cdot m^2/kg$ or greater. Meanwhile, from a viewpoint of noise reduction, the as of the ε-iron oxide powder is preferably 40 $A \cdot m^2/kg$ or less and more preferably 35 $A \cdot m^2/kg$ or less.

In the present invention and the present specification, an average particle size of various powders such as a ferromagnetic powder is taken as a value measured by the following method with a transmission electron microscope, unless otherwise noted.

The powder is imaged at an imaging magnification of 100,000 times with a transmission electron microscope, and the image is printed on photographic printing paper so that the total magnification is 500,000 times, to obtain a photograph of particles constituting the powder. A target particle is selected from the obtained photograph of particles, an outline of the particle is traced with a digitizer, and a size of the particle (primary particle) is measured. The primary particle refers to an independent particle without aggregation.

The aforementioned measurement is performed for randomly extracted 500 particles. An arithmetic mean of the particle sizes of 500 particles obtained as described above is taken as an average particle size of the powders. As the transmission electron microscope, a transmission electron microscope H-9000 manufactured by Hitachi, Ltd. can be used, for example. Furthermore, the measurement of the particle size can be performed by using well-known image analysis software, for example, image analysis software KS-400 manufactured by Carl Zeiss. Each average particle size shown in Examples which will be described later is a value measured by using the transmission electron microscope H-9000 manufactured by Hitachi, Ltd. as the transmission electron microscope, and using the image analysis software KS-400 manufactured by Carl Zeiss as the image analysis software, unless otherwise noted. In the present invention and the present specification, the powder means an aggregate of a plurality of particles. For example, the ferromagnetic powder means an aggregate of a plurality of ferromagnetic particles. Moreover, the aggregate of a plurality of particles is not limited to a form in which particles constituting the aggregate are in direct contact with each other, and also includes a form in which a binding agent, an additive, or the like, which will be described later, is interposed between the particles. The term particles may be used for representing a powder.

As the method for collecting the sample powder from the magnetic recording medium in order to measure the particle size, for example, the method described in paragraph 0015 of JP2011-048878A can be used.

In the present invention and the present specification, unless otherwise noted, (1) in a case where the shape of the particle observed in the aforementioned particle photograph is a needle shape, a fusiform shape, or a columnar shape (here, a height is greater than a maximum long diameter of a bottom surface), the size (particle size) of each particle constituting the powder is shown as a length of a long axis constituting the particle, that is, a long axis length, (2) in a case where the shape of the particle is a plate shape or a columnar shape (here, a thickness or a height is less than a maximum long diameter of a plate surface or a bottom surface), the particle size is shown as a maximum long diameter of the plate surface or the bottom surface, and (3) in a case where the shape of the particle is a spherical shape, a polyhedron shape, or an amorphous shape, and the long axis constituting the particles cannot be specified from the shape, the particle size is shown as an equivalent circle diameter. The equivalent circle diameter refers to a value obtained by a circle projection method.

In addition, an average aspect ratio of the powders refers to an arithmetic mean of values obtained for the 500 particles by measuring lengths of short axes of particles, that is, short axis lengths in the aforementioned measurement, and obtaining a value of (long axis length/short axis length) of each particle. Here, unless otherwise noted, in a case of the definition (1) of the particle size, the short axis length refers to a length of a short axis constituting a particle, similarly, in a case of the definition (2) thereof, the short axis length refers to a thickness or a height, and in a case of the definition (3) thereof, there is no distinction between the long axis and the short axis, and thus the (long axis length/short axis length) is regarded as 1 for convenience.

Furthermore, unless otherwise noted, in a case where the shapes of the particles are specified, for example, in a case of the definition (1) of the particle size, the average particle size is an average long axis length, and in a case of the definition (2) thereof, the average particle size is an average plate diameter. In a case of the definition (3) thereof, the average particle size is an average diameter (also referred to as an average particle diameter).

The content (filling percentage) of the ferromagnetic powder in the magnetic layer is preferably in a range of 50% to 90% by mass and more preferably in a range of 60% to 90% by mass. A higher filling percentage of the ferromagnetic powder in the magnetic layer is preferable from a viewpoint of improving recording density.

Binding Agent

The magnetic recording medium can be a coating-type magnetic recording medium, and can contain a binding agent in the magnetic layer. The binding agent is one or more kinds of resins. As the binding agent, various resins generally used as the binding agent of the coating-type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, methyl methacrylate, or the like, a cellulose resin such as nitrocellulose, an epoxy resin, a phenoxy resin, and a polyvinylalkylal resin such as polyvinyl acetal or polyvinyl butyral can be used alone, or a plurality of resins can be mixed with each other to be used. Among them, a polyurethane resin, an acrylic resin, a cellulose resin, and a vinyl chloride resin are preferable. These resins may be homopolymers or copolymers. These resins can also be used as the binding agent in a non-magnetic layer and/or a back coating layer which will be described later.

Regarding the aforementioned binding agent, the descriptions disclosed in paragraphs 0028 to 0031 of JP2010-024113A can be referred to. An average molecular weight of the resin used as the binding agent can be, for example, 10,000 to 200,000 as a weight-average molecular weight. The binding agent can be used, for example, in an amount of 1.0 to 30.0 parts by mass with respect to 100.0 parts by mass of the ferromagnetic powder.

Curing Agent

A curing agent can also be used together with the resin which can be used as the binding agent. As the curing agent, in one form, a thermosetting compound which is a compound in which a curing reaction (crosslinking reaction) proceeds due to heating can be used, and in another form, a photocurable compound in which a curing reaction (crosslinking reaction) proceeds due to light irradiation can be used. As the curing reaction proceeds in a magnetic layer forming step, at least a part of the curing agent may be contained in the magnetic layer in a state of being reacted (crosslinked) with other components such as the binding agent. In a case where the composition used for forming the other layer contains the curing agent, the above matter is also true of a layer formed of the composition. The preferred curing agent is a thermosetting compound, and polyisocyanate is suitable. For details of the polyisocyanate, the descriptions disclosed in paragraphs 0124 and 0125 of JP2011-216149A can be referred to. The curing agent can be used, for example, in an amount of 0 to 80.0 parts by mass with respect to 100.0 parts by mass of the binding agent in the magnetic layer-forming composition, and preferably in an amount of 50.0 to 80.0 parts by mass from a viewpoint of improving the hardness of the magnetic layer.

Additive

The magnetic layer may contain one or more kinds of additives, as necessary. The additive can be used by appropriately selecting a commercially available product according to desired properties. Alternatively, a compound synthesized by a well-known method can also be used as an additive. The additive can be used in any amount. As an example of the additives, the aforementioned curing agent can be mentioned. Moreover, examples of the additive contained in the magnetic layer include a non-magnetic powder (for example, an inorganic powder, carbon black, and the like), a lubricant, a dispersing agent, a dispersing assistant, a fungicide, an antistatic agent, and an antioxidant. Regarding the lubricant, the descriptions disclosed in paragraphs 0030 to 0033, 0035, and 0036 of JP2016-126817A can be referred to, for example. The lubricant may be contained in the non-magnetic layer which will be described later. Regarding the lubricant which may be contained in the non-magnetic layer, the descriptions disclosed in paragraphs 0030, 0031, 0034, 0035, and 0036 of JP2016-126817A can be referred to. Regarding the dispersing agent, the descriptions disclosed in paragraphs 0061 and 0071 of JP2012-133837A can be referred to. The dispersing agent may be added to the non-magnetic layer-forming composition. Regarding the dispersing agent which may be added to the non-magnetic layer-forming composition, the description disclosed in paragraph 0061 of JP2012-133837A can be referred to. Furthermore, examples of the non-magnetic powder, which may be contained in the magnetic layer, include a non-magnetic powder which can function as an abrasive, and a non-magnetic powder (for example, non-magnetic colloidal particles, and the like) which can function as a projection formation agent for forming projections that appropriately protrude from the surface of the magnetic layer. Regarding the abrasive, the descriptions disclosed in paragraphs 0030 to 0032 of JP2004-273070A can be referred to. As the projection formation agent, colloidal particles are preferable, from a viewpoint of ease of availability, inorganic colloidal particles are preferable, inorganic oxide colloidal particles are more preferable, and silica colloidal particles (colloidal silica) are even more preferable. Average particle sizes of the abrasive and the projection formation agent are each preferably in a range of 30 to 200 nm and more preferably in a range of 50 to 100 nm.

It is thought that the aforementioned number of bright regions can be an index of the presence state of the abrasive on the surface of the magnetic layer. Therefore, the number of bright regions can be controlled by kinds of non-magnetic powders to be added as an abrasive, a method for preparing an abrasive solution, and the like. As the abrasive, a non-magnetic powder having a Mohs hardness of greater than 8 is preferable, and a non-magnetic powder having a Mohs hardness of 9 or greater is more preferable. A maximum value of the Mohs hardness is 10. The abrasive can be a powder of an inorganic substance, and can also be a powder of an organic substance. The abrasive can be a powder of an inorganic or organic oxide, or a powder of a carbide. Examples of the carbide include boron carbide (for example, $B_4C$) and titanium carbide (for example, TiC). Moreover, diamond can also be used as an abrasive. In one form, the abrasive is preferably a powder of an inorganic oxide. Specifically, as the inorganic oxide, alumina (for example, $Al_2O_3$), titanium oxide (for example, $TiO_2$), cerium oxide (for example, $CeO_2$), zirconium oxide (for example, $ZrO_2$), and the like can be mentioned, and among them, alumina is preferable. A Mohs hardness of the alumina is about 9. Regarding the alumina powder, the description disclosed in paragraph 0021 of JP2013-229090A can also be referred to. A content of the abrasive in the magnetic layer is preferably 1.0 to 20.0 parts by mass and more preferably 1.0 to 15.0 parts by mass, with respect to 100.0 parts by mass of the ferromagnetic powder. As the abrasive, only one kind of non-magnetic powder may be used, or two or more kinds of non-magnetic powders having different compositions and/or physical properties (for example, a size) may be used. In a case where two or more kinds of non-magnetic powders are used as the abrasive, the content of the abrasive means the total content of these two or more kinds of non-magnetic powders. The above matter is also true of contents of various components in the present invention and the present specification. The abrasive is preferably subjected to a dispersion treatment separately from the ferromagnetic powder (separate dispersion), and more preferably subjected to a dispersion treatment separately from the projection formation agent (separate dispersion). In a case of preparing the magnetic layer-forming composition, as a dispersion liquid (hereinafter, also referred to as an "abrasive solution") of the abrasive, two or more kinds of dispersion liquids having different components and/or dispersion conditions can also be prepared.

In order to adjust the dispersion state of the abrasive solution, a dispersing agent can also be used. As a compound which can function as a dispersing agent for enhancing the dispersibility of the abrasive, an aromatic hydrocarbon compound having a phenolic hydroxy group can be mentioned. The "phenolic hydroxy group" refers to a hydroxy group directly bonded to an aromatic ring. The aromatic ring contained in the aromatic hydrocarbon compound may be a monocyclic ring, may have a polycyclic ring structure, or may be a fused ring. From a viewpoint of improving the dispersibility of the abrasive, an aromatic hydrocarbon compound containing a benzene ring or a naphthalene ring is preferable. Moreover, the aromatic hydrocarbon compound may have a substituent other than the phenolic hydroxy group. Examples of the substituent other than the phenolic hydroxy group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxy groups contained in one molecule of the aromatic hydrocarbon compound may be one, two, three, or more.

As a preferred form of the aromatic hydrocarbon compound having a phenolic hydroxy group, a compound represented by Formula 100 can be mentioned.

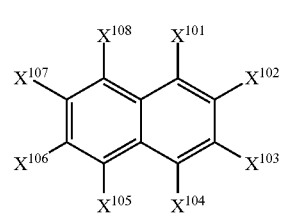

Formula 100

[In Formula 100, two among $X^{101}$ to $X^{108}$ are hydroxy groups, and the other six each independently represent a hydrogen atom or a substituent.]

In the compound represented by Formula 100, substitution positions of two hydroxy groups (phenolic hydroxy groups) are not particularly limited.

In the compound represented by Formula 100, two among $X^{101}$ to $X^{108}$ are hydroxy groups (phenolic hydroxy groups), and the other six each independently represent a hydrogen atom or a substituent. Moreover, among $X^{101}$ to $X^{108}$, all parts other than the two hydroxy groups may be hydrogen atoms, and some or all of the parts may be substituents. As the substituent, the aforementioned substituents can be exemplified. One or more phenolic hydroxy groups may be contained as a substituent other than the two hydroxy groups. From a viewpoint of improving the dispersibility of the abrasive, it is preferable that groups other than the two hydroxy groups among $X^{101}$ to $X^{108}$ are not phenolic hydroxy groups. That is, the compound represented by Formula 100 is preferably dihydroxynaphthalene or a derivative thereof, and more preferably 2,3-dihydroxynaphthalene or a derivative thereof. Examples of a substituent, which is preferable as the substituent represented by $X^{101}$ to $X^{108}$, include a halogen atom (for example, a chlorine atom and a bromine atom), an amino group, an alkyl group having 1 to 6 (preferably 1 to 4) carbon atoms, a methoxy group, an ethoxy group, an acyl group, a nitro group, a nitroso group, and a —$CH_2OH$ group.

Furthermore, regarding the dispersing agent for enhancing the dispersibility of the abrasive, the descriptions disclosed in paragraphs 0024 to 0028 of JP2014-179149A can also be referred to.

For example, in a case of preparing the abrasive solution, the dispersing agent for enhancing the dispersibility of the abrasive can be used, for example, in a ratio of 0.5 to 20.0 parts by mass and preferably in a ratio of 1.0 to 10.0 parts by mass, with respect to 100.0 parts by mass of the abrasive.

The aforementioned magnetic layer can be provided directly on the surface of the non-magnetic support, or indirectly on the surface via the non-magnetic layer.

Non-Magnetic Layer

Next, the non-magnetic layer will be described. The magnetic recording medium may have the magnetic layer directly on the surface of the non-magnetic support, or may have the magnetic layer on the surface of the non-magnetic support via the non-magnetic layer containing the non-magnetic powder. The non-magnetic powder used for the non-magnetic layer may be a powder of an inorganic substance or a powder of an organic substance. Moreover, carbon black or the like can also be used. Examples of the powder of the inorganic substance include powders of a metal, a metal oxide, metal carbonate, metal sulfate, a metal nitride, a metal carbide, a metal sulfide, and the like. These non-magnetic powders are available as a commercially available product, and can also be produced by a well-known method. For details thereof, the descriptions disclosed in paragraphs 0146 to 0150 of JP2011-216149A can be referred to. Regarding the carbon black which can be used for the non-magnetic layer, the descriptions disclosed in paragraphs 0040 and 0041 of JP2010-024113A can also be referred to. The content (filling percentage) of the non-magnetic powder in the non-magnetic layer is preferably in a range of 50% to 90% by mass and more preferably in a range of 60% to 90% by mass.

The non-magnetic layer can contain a binding agent, and can also contain an additive. For other details of the binding agent, the additive, and the like of the non-magnetic layer, well-known technologies for the non-magnetic layer can be applied. Furthermore, for example, regarding the kind and content of the binding agent, the kind and content of the additive, and the like, well-known technologies for the magnetic layer can also be applied.

The non-magnetic layer in the present invention and the present specification also includes a substantially non-magnetic layer containing a small amount of a ferromagnetic powder, for example, as impurities or intentionally, together with the non-magnetic powder. Here, the substantially non-magnetic layer refers to a layer having a residual magnetic flux density of 10 mT or lower, a layer having a coercivity of 7.96 kA/m (100 Oe) or less, or a layer having a residual magnetic flux density of 10 mT or lower and a coercivity of 7.96 kA/m (100 Oe) or less. It is preferable that the non-magnetic layer does not have a residual magnetic flux density and a coercivity.

Non-Magnetic Support

Next, the non-magnetic support (hereinafter, also simply referred to as a "support") will be described.

Examples of the non-magnetic support include well-known components such as polyethylene terephthalate, polyethylene naphthalate, polyamide, polyamide imide, and aromatic polyamide, which are subjected to biaxial stretching. Among them, polyethylene terephthalate, polyethylene naphthalate, and polyamide are preferable. These supports may be subjected to corona discharge, a plasma treatment, an easy-bonding treatment, a heat treatment, or the like in advance.

Back Coating Layer

The magnetic recording medium may or may not have a back coating layer which contains a non-magnetic powder and is provided on a surface side of the non-magnetic support opposite to the surface side on which the magnetic layer is provided. Regarding the non-magnetic powder of the back coating layer, the aforementioned descriptions for the non-magnetic powder of the non-magnetic layer can be referred to.

The recess in the surface of the magnetic layer can be formed by transferring a surface shape of the back surface to the surface of the magnetic layer (so-called offset) in a state where the surface and the back surface of the magnetic layer wound in a roll shape are in contact with each other, in a step of manufacturing the magnetic recording medium, and the like. The back surface is a surface of the back coating layer in a case where the back coating layer is provided, and is a surface of the support in a case where the back coating layer is not provided. As an example of a method for controlling the presence state of the recess in the surface of the magnetic layer, selecting kinds of components to be added to the composition for forming the back coating layer in order to adjust the surface shape of the back surface can be mentioned. In this regard, as the non-magnetic powder of the back coating layer, it is preferable to use carbon black and a non-magnetic powder other than carbon black in combination, or use carbon black (that is, the non-magnetic powder of the back coating layer consists of carbon black). Examples of the non-magnetic powder other than carbon black include non-magnetic powders exemplified above as a powder which can be contained in the non-magnetic layer. Regarding the non-magnetic powder of the back coating layer, a proportion of the carbon black with respect to 100.0 parts by mass of the total amount of the non-magnetic powder is preferably in a range of 50.0 to 100.0 parts by mass, more preferably in a range of 70.0 to 100.0 parts by mass, and even more preferably in a range of 90.0 to 100.0 parts by mass. Moreover, it is also preferable that the total amount of the non-magnetic powder of the back coating layer corresponds to carbon black. The content of the non-magnetic powder in the back coating layer is preferably in a range of 50% to 90% by mass and more preferably in a range of 60% to 90% by mass, with respect to the total mass of the back coating layer.

From a viewpoint of ease of control of the number of recesses which are present in the surface of the magnetic layer and have an equivalent circle diameter within the above range, in one form, it is preferable to use a non-magnetic powder having an average particle size of 50 nm or smaller as the non-magnetic powder of the back coating layer. As the non-magnetic powder of the back coating layer, only one kind of non-magnetic powder may be used, or two or more kinds thereof may be used. In a case where two or more kinds thereof (for example, carbon black and a non-magnetic powder other than carbon black) are used, an average particle size of each non-magnetic powder is preferably 50 nm or smaller. The average particle size of the non-magnetic powder is more preferably in a range of 10 to 50 nm and even more preferably in a range of 10 to 30 nm. In one form, it is preferable that the total amount of the non-magnetic powder contained in the back coating layer corresponds to carbon black and the average particle size thereof is 50 nm or smaller.

In order to control the presence state of the recess in the surface of the magnetic layer, it is preferable that a back coating layer-forming composition contains a component (dispersing agent) capable of enhancing the dispersibility of the non-magnetic powder contained in the composition. The back coating layer-forming composition more preferably contains a non-magnetic powder having an average particle size of 50 nm or smaller, and a component capable of enhancing the dispersibility of the non-magnetic powder, and even more preferably contains carbon black having an average particle size of 50 nm or smaller, and a component capable of enhancing the dispersibility of the carbon black.

As an example of such a dispersing agent, a compound having an ammonium salt structure of an alkyl ester anion represented by Formula 1 can be used. Moreover, the "alkyl ester anion" can also be referred to as an "alkyl carboxylate anion".

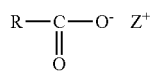

Formula 1

In Formula 1, R represents an alkyl group having 7 or more carbon atoms or a fluorinated alkyl group having 7 or more carbon atoms, and $Z^+$ represents an ammonium cation.

Furthermore, from a viewpoint of improving the dispersibility of the carbon black, in one form, two or more kinds of components capable of forming the compound having the aforementioned salt structure can be used in a case of preparing the back coating layer-forming composition. Accordingly, in a case of preparing the back coating layer-forming composition, at least a part of these components can form the compound having the aforementioned salt structure.

Unless otherwise noted, groups described below may have a substituent or may be unsubstituted. Moreover, "the number of carbon atoms" in a group having a substituent means the number of carbon atoms which does not include the number of carbon atoms in the substituent, unless otherwise noted. In the present invention and the present specification, examples of the substituent include an alkyl group (for example, an alkyl group having 1 to 6 carbon atoms), a hydroxy group, an alkoxy group (for example, an alkoxy group having 1 to 6 carbon atoms), a halogen atom (for example, a fluorine atom, a chlorine atom, a bromine atom, and the like), a cyano group, an amino group, a nitro group, an acyl group, a carboxy group, a salt of a carboxy group, a sulfonic acid group, and a salt of a sulfonic acid group.

Hereinafter, Formula 1 will be described in more detail.

In Formula 1, R represents an alkyl group having 7 or more carbon atoms or a fluorinated alkyl group having 7 or more carbon atoms. The fluorinated alkyl group has a structure in which some or all of hydrogen atoms constituting an alkyl group are substituted with fluorine atoms. The alkyl group or fluorinated alkyl group represented by R may have a linear structure, may have a branched structure, or may be a cyclic alkyl group or a cyclic fluorinated alkyl group, and preferably has a linear structure. The alkyl group or fluorinated alkyl group represented by R may have a substituent or may be unsubstituted, and is preferably unsubstituted. The alkyl group represented by R can be represented by, for example, $C_nH_{2n+1}$—. Here, n represents an integer of 7 or greater. Furthermore, the fluorinated alkyl group represented by R can have a structure in which some or all of hydrogen atoms constituting an alkyl group represented by, for example, $C_nH_{2n+1}$— are substituted with fluorine atoms. The number of carbon atoms in the alkyl group or fluorinated alkyl group represented by R is 7 or more, preferably 8 or more, more preferably 9 or more, even more preferably 10 or more, still preferably 11 or more, still more preferably 12 or more, and still even more preferably 13 or more. Moreover, the number of carbon atoms in the alkyl group or fluorinated alkyl group represented by R is preferably 20 or less, more preferably 19 or less, and even more preferably 18 or less.

In Formula 1, $Z^+$ represents an ammonium cation. Specifically, the ammonium cation has the following structure. In the present invention and the present specification, "*" in a formula representing a part of a compound represents a bonding position between the structure of the part and an adjacent atom.

A nitrogen cation $N^+$ of the ammonium cation and an oxygen anion $O^-$ in Formula 1 can form a salt-crosslinking group to form the ammonium salt structure of the alkyl ester anion represented by Formula 1. The fact in which the compound having the ammonium salt structure of the alkyl ester anion represented by Formula 1 is contained in the back coating layer can be confirmed by analyzing the magnetic recording medium through electron spectroscopy for chemical analysis (ESCA), infrared spectroscopy (IR), or the like.

In one form, the ammonium cation represented by r can be obtained, for example, by converting a nitrogen atom of a nitrogen-containing polymer into a cation. The nitrogen-containing polymer refers to a polymer containing a nitrogen atom. In the present invention and the present specification, the term "polymer" is used in the sense of including a homopolymer and a copolymer. In one form, the nitrogen atom can be contained as an atom constituting a main chain of a polymer, and in another form, the nitrogen atom can be contained as an atom constituting a side chain of a polymer.

As one form of the nitrogen-containing polymer, polyalkylene imine can be mentioned. The polyalkylene imine is a ring-opened polymer of alkylene imine, and is a polymer having a plurality of repeating units represented by Formula 2.

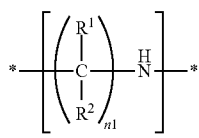

Formula 2

A nitrogen atom N constituting a main chain in Formula 2 can be converted into a nitrogen cation $N^+$ to obtain the ammonium cation represented by $Z^+$ in Formula 1. Then, the ammonium cation can form an ammonium salt structure together with an alkyl ester anion, for example, as follows.

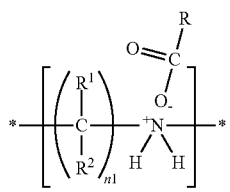

Hereinafter, Formula 2 will be described in more detail.

In Formula 2, $R^1$ and $R^2$ each independently represent a hydrogen atom or an alkyl group, and n1 represents an integer of 2 or greater.

Examples of the alkyl group represented by $R^1$ or $R^2$ include an alkyl group having 1 to 6 carbon atoms, an alkyl group having 1 to 3 carbon atoms is preferable, a methyl group or an ethyl group is more preferable, and a methyl group is even more preferable. The alkyl group represented by $R^1$ or $R^2$ is preferably an unsubstituted alkyl group. A combination of $R^1$ and $R^2$ in Formula 2 is in a form in which one of them is a hydrogen atom and the other is an alkyl group, a form in which the both are hydrogen atoms, or a form in which the both are alkyl groups (same or different alkyl groups), and is preferably in a form in which the both are hydrogen atoms. In the alkylene imine which forms polyalkylene imine, a structure having the smallest number of carbon atoms constituting a ring is ethylene imine, and the number of carbon atoms in a main chain of alkylene imine (ethylene imine) obtained by ring-opening of ethylene imine is 2. Therefore, n1 in Formula 2 is 2 or greater. n1 in Formula 2 can be, for example, 10 or less, 8 or less, 6 or less, or 4 or less. The polyalkylene imine may be a homopolymer having, as the repeating structure represented by Formula 2, only the same structure, or may be a copolymer having, as the repeating structure represented by Formula 2, two or more kinds of different structures. A number-average molecular weight of the polyalkylene imine, which can be used to form the compound having the ammonium salt structure of the alkyl ester anion represented by Formula 1, can be, for example, 200 or greater, and is preferably 300 or greater and more preferably 400 or greater. Moreover, the number-average molecular weight of the polyalkylene imine can be, for example, 10,000 or less, and is preferably 5,000 or less and more preferably 2,000 or less.

In the present invention and the present specification, average molecular weight (weight-average molecular weight and number-average molecular weight) means a value obtained by performing standard polystyrene conversion, as measured by gel permeation chromatography (GPC). Average molecular weights shown in Examples which will be described later are values (polystyrene conversion values) obtained by performing standard polystyrene conversion on values measured using GPC under the following measurement conditions, unless otherwise noted.

GPC device: HLC-8220 (manufactured by Tosoh Corporation)

Guard column: TSKguardcolumn Super HZM-H

Column: TSKgel Super HZ 2000, TSKgel Super HZ 4000, TSKgel Super HZ-M (manufactured by Tosoh Corporation, 4.6 mm (inner diameter)×15.0 cm, 3 types of columns are connected in series)

Eluent: Tetrahydrofuran (THF) and stabilizer (2,6-di-t-butyl-4-methylphenol) are contained Eluent flow rate: 0.35 mL/min Column temperature: 40° C.

Inlet temperature: 40° C.

Refractive index (RI) measurement temperature: 40° C.

Sample concentration: 0.3% by mass

Sample injection volume: 10 μL

In addition, as another form of the nitrogen-containing polymer, polyallylamine can be mentioned. The polyallylamine is a polymer of allylamine, and is a polymer having a plurality of repeating units represented by Formula 3.

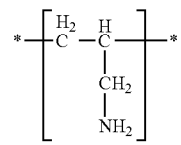

Formula 3

A nitrogen atom N constituting an amino group on a side chain in Formula 3 can be converted into a nitrogen cation $N^+$ to obtain the ammonium cation represented by $Z^+$ in Formula 1. Then, the ammonium cation can form an ammonium salt structure together with an alkyl ester anion, for example, as follows.

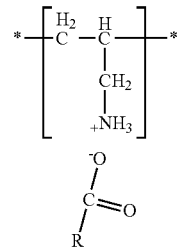

A weight-average molecular weight of the polyallylamine, which can be used to form the compound having the ammonium salt structure of the alkyl ester anion represented by Formula 1, can be, for example, 200 or greater, and is preferably 1,000 or greater and more preferably 1,500 or greater. Moreover, the weight-average molecular weight of the polyallylamine can be, for example, 15,000 or less, and is preferably 10,000 or less and more preferably 8,000 or less.

The fact in which a compound having a structure derived from the polyalkylene imine or the polyallylamine, as the compound having the ammonium salt structure of the alkyl ester anion represented by Formula 1, is contained in the back coating layer can be confirmed by analyzing the surface of the back coating layer through time-of-flight secondary ion mass spectrometry (TOF-SIMS), or the like.

The compound having the ammonium salt structure of the alkyl ester anion represented by Formula 1 can be a salt of the nitrogen-containing polymer with one or more kinds of fatty acids selected from the group consisting of a fatty acid having 7 or more carbon atoms and a fluorinated fatty acid having 7 or more carbon atoms. The nitrogen-containing polymer forming the salt can be one or more kinds of nitrogen-containing polymers, and can be, for example, a nitrogen-containing polymer selected from the group consisting of polyalkylene imine and polyallylamine. The fatty acids forming the salt can be one or more kinds of fatty acids selected from the group consisting of a fatty acid having 7 or more carbon atoms and a fluorinated fatty acid having 7 or more carbon atoms. The fluorinated fatty acid has a structure in which some or all of hydrogen atoms constituting an alkyl group bonded to a carboxy group COOH in a fatty acid are substituted with fluorine atoms. For example, a salt formation reaction can easily proceed by mixing the nitrogen-containing polymer with the fatty acids at room temperature. The room temperature is, for example, about 20° C. to 25° C. In one form, the salt formation reaction can be caused to proceed by using one or more kinds of nitrogen-containing polymers and one or more kinds of the fatty acids as the components of the back coating layer-forming composition, and mixing the components in a step of preparing the back coating layer-forming composition. Moreover, in one form, before the back coating layer-forming composition is prepared, one or more kinds of nitrogen-containing polymers and one or more kinds of the fatty acids are mixed to form a salt, and then this salt can be used as the component of the back coating layer-forming composition to prepare the back coating layer-forming composition. Furthermore, in a case where the nitrogen-containing polymer and the fatty acids are mixed to form the ammonium salt of the alkyl ester anion represented by Formula 1, a nitrogen atom constituting the nitrogen-containing polymer may also be reacted with a carboxy group of the fatty acids to form the following structure, and a form including such a structure is also included in the aforementioned compound.

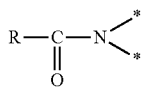

Examples of the fatty acids include a fatty acid having the alkyl group described above as R in Formula 1, and a fluorinated fatty acid having the fluorinated alkyl group described above as R in Formula 1.

A mixing ratio between the nitrogen-containing polymer and the fatty acids, which can be used to form the compound having the ammonium salt structure of the alkyl ester anion represented by Formula 1, is preferably 10:90 to 90:10, more preferably 20:80 to 85:15, and even more preferably 30:70 to 80:20, in terms of a mass ratio of the nitrogen-containing polymer:the fatty acids. Moreover, in a case of preparing the back coating layer-forming composition, the compound having the ammonium salt structure of the alkyl ester anion represented by Formula 1 can be used, for example, in an amount of 1.0 to 20.0 parts by mass and preferably in an amount of 1.0 to 10.0 parts by mass, with respect to 100.0 parts by mass of the carbon black. Furthermore, for example, in a case of preparing the back coating layer-forming composition, the nitrogen-containing polymer can be used in an amount of 0.1 to 10.0 parts by mass and preferably in an amount of 0.5 to 8.0 parts by mass, per 100.0 parts by mass of the carbon black. The fatty acids can be used, for example, in an amount of 0.05 to 10.0 parts by mass and preferably in an amount of 0.1 to 5.0 parts by mass, per 100.0 parts by mass of the carbon black.

Regarding components which can be contained in the back coating layer, the back coating layer can contain a binding agent, and can also contain an additive. Regarding the binding agent and additive in the back coating layer, well-known technologies for the back coating layer can be applied, and well-known technologies for the formulation of the magnetic layer and/or the non-magnetic layer can also be applied. For example, regarding the back coating layer, the descriptions disclosed in paragraphs 0018 to 0020 of JP2006-331625A and column 4, line 65 to column 5, line 38 of U.S. Pat. No. 7,029,774B can be referred to.

Various Thicknesses

Regarding a thickness (total thickness) of the magnetic recording medium, with an enormous increase in the quantity of information in recent years, a magnetic recording medium is required to have a higher recording capacity (higher capacity). For example, as a means for increasing the capacity of a tape-shaped magnetic recording medium (that is, a magnetic tape), reducing a thickness of the magnetic tape to increase a length of the magnetic tape housed per roll of the magnetic tape cartridge can be mentioned. In this regard, the thickness (total thickness) of the magnetic recording medium is preferably 5.6 µm or less, more preferably 5.5 µm or less, even more preferably 5.4 µm or less, still preferably 5.3 µm or less, and still more preferably 5.2 µm or less. Moreover, from a viewpoint of ease of handling, the thickness of the magnetic recording medium is preferably 3.0 µm or greater and more preferably 3.5 µm or greater.

The thickness (total thickness) of the magnetic recording medium can be measured by the following method.

Ten samples (for example, having a length of 5 to 10 cm) are cut out from any portion of the magnetic recording medium, these samples are stacked, and a thickness thereof is measured. A value (thickness per sample) obtained by taking the measured thickness by 1/10 is taken as a total thickness. The thickness measurement can be performed using a well-known measuring instrument capable of measuring a thickness on the order of 0.1 µm.

A thickness of the non-magnetic support is preferably 3.0 to 5.0 µm.

A thickness of the magnetic layer can be optimized according to a saturation magnetization amount of the magnetic head used, a head gap length, a recording signal band, and the like, is generally 0.01 µm to 0.15 µm, and, from a viewpoint of high-density recording, is preferably 0.02 µm to 0.12 µm and more preferably 0.03 µm to 0.1 µm. The magnetic layer may be at least one layer, or the magnetic layer may be separated into two or more layers having different magnetic characteristics, and a configuration regarding a well-known multilayered magnetic layer can be applied. A thickness of the magnetic layer, which is separated into two or more layers, is a total thickness of these layers.

A thickness of the non-magnetic layer is, for example, 0.1 to 1.5 µm and preferably 0.1 to 1.0 µm.

A thickness of the back coating layer is preferably 0.9 µm or less and more preferably 0.1 to 0.7 µm.

Various thicknesses such as the thickness of the magnetic layer can be obtained by the following method.

A cross section of the magnetic recording medium in the thickness direction is exposed to ion beams, and then the exposed cross section is subjected to cross section observation with a scanning electron microscope. Various thicknesses can be obtained as an arithmetic mean of thicknesses obtained at any two spots in the cross section observation. Alternatively, various thicknesses can also be obtained as designed thicknesses calculated from manufacturing conditions or the like.

Manufacturing Steps

Preparation of Each Layer-Forming Composition

A composition for forming the magnetic layer, the non-magnetic layer, or the back coating layer generally contains a solvent, together with the aforementioned various components. As the solvent, one or more kinds of various solvents generally used for manufacturing a coating-type magnetic recording medium can be used. A content of the solvent in the each layer-forming composition is not particularly limited. Regarding the solvent, the description disclosed in paragraph 0153 of JP2011-216149A can be referred to. A concentration of solid contents and a solvent composition of the each layer-forming composition may be appropriately adjusted according to handling suitability of the composition, coating conditions, and a thickness of each layer to be formed. A step of preparing the composition for forming the magnetic layer, the non-magnetic layer, or the back coating layer can generally include at least a kneading step, a dispersing step, and, as necessary, a mixing step provided before and after these steps. Each step may be divided into two or more stages. Various components used in the preparation of the each layer-forming composition may be added at the beginning of or during any step. Moreover, the respective components may be dividedly added in two or more steps. For example, the binding agent may be dividedly added in a kneading step, a dispersing step, and a mixing step for adjusting a viscosity after dispersion. In the manufacturing steps of the magnetic recording medium, manufacturing technologies well known in the related art can be used as a part of the steps. In the kneading step, an open kneader, a continuous kneader, a pressure kneader, or a kneader having a strong kneading force, such as an extruder, can be used. Details of the kneading step are described in JP1989-106338A (JP-H01-106338A) and JP1989-079274A (JP-H01-079274A). As a disperser, various well-known dispersers using a shearing force, such as a beads mill, a ball mill, a sand mill, or a homomixer, can be used. Dispersion beads can preferably be used for the dispersion. Examples of the dispersion beads include ceramic beads and glass beads, and zirconia beads are preferable. Two or more kinds of beads may be used in combination. A bead diameter (particle diameter) and a bead filling percentage of the dispersion beads are not particularly limited, and may be set according to the powder to be dispersed. The each layer-forming composition may be filtered by a well-known method before being subjected to the coating step. The filtering can be performed with a filter, for example. As the filter used in the filtering, for example, a filter (for example, a filter made of a glass fiber, a filter made of polypropylene, or the like) having a pore diameter of 0.01 to 3 μm can be used.

The abrasive solution is preferably prepared by being dispersed separately from the ferromagnetic powder and the projection formation agent. The dispersion state of the abrasive in the abrasive solution can be adjusted according to whether or not a dispersing agent for improving the dispersibility of the abrasive is used, an amount of such a dispersing agent used, treatment conditions for a dispersion treatment such as bead dispersion, treatment conditions for a classification treatment such as centrifugal separation, and the like. Moreover, adjusting the dispersion state of the abrasive is preferable in controlling the aforementioned number of bright regions. The abrasive solution is preferably prepared as one or more kinds of abrasive solutions containing the abrasive, the solvent, and preferably the binding agent, separately from the ferromagnetic powder and the projection formation agent, and can be used to prepare a magnetic layer-forming composition. Commercially available devices can be used for the dispersion treatment and the classification treatment. The conditions for performing these treatments are not particularly limited, and may be set according to a type of a device to be used or the like.

Coating Step

The magnetic layer can be formed by applying the magnetic layer-forming composition directly on the surface of the non-magnetic support, or by performing multilayer application of the magnetic layer-forming composition sequentially or simultaneously with the non-magnetic layer-forming composition. The back coating layer can be formed by applying a back coating layer-forming composition onto the surface of the non-magnetic support opposite to the surface on which the non-magnetic layer and/or the magnetic layer is provided (or the non-magnetic layer and/or the magnetic layer will be provided later). For details of the coating for forming each layer, the description disclosed in paragraph 0066 of JP2010-231843A can be referred to.

Other Steps

Regarding various other steps for manufacturing the magnetic recording medium, well-known technologies can be applied. Regarding the various steps, the descriptions disclosed in paragraphs 0067 to 0070 of JP2010-231843A can be referred to, for example. For example, a coating layer formed of the magnetic layer-forming composition can be subjected to an alignment treatment in an alignment zone, while the coating layer is in a wet state. Regarding the alignment treatment, various well-known technologies such as the description disclosed in paragraph 0052 of JP2010-024113A can be applied. For example, a homeotropic alignment treatment can be performed by a well-known method such as a method using a different polar facing magnet. In the alignment zone, a drying speed of the coating layer can be controlled by a temperature and an air flow of the dry air and/or a transportation rate in the alignment zone. Moreover, the coating layer may be preliminarily dried before being transported to the alignment zone. As an example, a magnetic field strength in the homeotropic alignment treatment can be set to 0.1 to 1.5 T.

The magnetic recording medium can be a tape-shaped magnetic recording medium (magnetic tape), and can also be a disk-shaped magnetic recording medium (magnetic disk). For example, regarding the magnetic tape, by going through various steps, a long magnetic tape original roll can be obtained. The obtained magnetic tape original roll is cut (slit) into a width of a magnetic tape to be wound around the magnetic tape cartridge, by a well-known cutting machine. The width is determined according to the standard and is generally ½ inches. ½ inches=12.65 mm. A servo pattern is generally formed on the magnetic tape obtained by slitting. The detail of the servo pattern will be described later. The magnetic tape is generally housed in a magnetic tape cartridge and the magnetic tape cartridge is mounted on a magnetic recording and reproducing device. In the magnetic tape cartridge, the magnetic tape is generally housed in a cartridge main body in a state of being wound around a reel. The reel is rotatably comprised in the cartridge main body. As the magnetic tape cartridge, a single reel-type magnetic tape cartridge including one reel in a cartridge main body and a twin reel-type magnetic tape cartridge including two reels in a cartridge main body are widely used. In a case where the single reel-type magnetic tape cartridge is mounted in the magnetic tape device in order to record and/or reproduce data on the magnetic tape, the magnetic tape is drawn from the magnetic tape cartridge and wound around the reel on the magnetic tape device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic tape device side. In the meantime, the magnetic head and the surface of the magnetic layer of the magnetic tape come into contact with each other and slide, and accordingly, the recording and/or reproducing of data is performed. Meanwhile, in the twin reel-type magnetic tape cartridge, both reels of the supply reel and the winding reel are provided in the magnetic tape cartridge.

Formation of Servo Pattern

A servo pattern can be formed on the magnetic recording medium by a well-known method, in order to enable tracking control of the magnetic head, control of a running speed of the magnetic recording medium, and the like in the magnetic recording and reproducing device. The "formation of the servo pattern" can also be said to be "recording of a servo signal". Hereinafter, the formation of the servo pattern will be described using a magnetic tape as an example.

The servo pattern is generally formed along a longitudinal direction of the magnetic tape. Examples of a control (servo control) method using a servo signal include a timing-based servo (TBS), an amplitude servo, and a frequency servo.

As shown in European Computer Manufacturers Association (ECMA)-319 (June 2001), a timing-based servo method is used in a magnetic tape (generally referred to as a "linear tape-open (LTO) tape") based on an LTO standard. In this timing-based servo method, the servo pattern is formed by continuously disposing a plurality of pairs of magnetic stripes (also referred to as "servo stripes"), which are not parallel to each other, in the longitudinal direction of the magnetic tape. A reason for that the servo pattern is formed with one pair of magnetic stripes, which are not parallel to each other, as described above is to teach a passage position to a servo signal reading element passing on the servo pattern. Specifically, the one pair of the magnetic stripes are formed so that an interval thereof is continuously changed along the width direction of the magnetic tape, and a relative position between the servo pattern and the servo signal reading element can be recognized, by the reading of the interval thereof by the servo signal reading element. The information of this relative position enables the tracking of a data track. Accordingly, a plurality of servo tracks are generally set on the servo pattern along the width direction of the magnetic tape.

A servo band is configured of a servo signal continuous in the longitudinal direction of the magnetic tape. A plurality of these servo bands are generally provided on the magnetic tape. For example, the number thereof is 5 in the LTO tape. A region interposed between two adjacent servo bands is referred to as a data band. The data band is configured of a plurality of data tracks and each data track corresponds to each servo track.

In addition, in one form, as shown in JP2004-318983A, information (also referred to as "servo band identification (ID)" or "unique data band identification method (UDIM) information") indicating servo band numbers is embedded in each servo band. This servo band ID is recorded by shifting a specific pair of servo stripes among the plurality of pairs of servo stripes in the servo band so that the position of the specific pair is relatively displaced in the longitudinal direction of the magnetic tape. Specifically, the method for shifting the specific pair of servo stripes among the plurality of pairs of servo stripes is changed for each servo band. Accordingly, the recorded servo band ID is unique for each servo band, and thus the servo band can be uniquely specified by only reading one servo band by the servo signal reading element.

Furthermore, as a method for uniquely specifying the servo band, a staggered method as shown in ECMA-319 (June 2001) is also used. In this staggered method, the group of a plurality of pairs of magnetic stripes (servo stripes) not parallel to each other, which are continuously disposed in the longitudinal direction of the magnetic tape, is recorded so as to be shifted in the longitudinal direction of the magnetic tape for each servo band. A combination of shifting methods between the adjacent servo bands is unique in the entire magnetic tape, and accordingly, the servo band can also be uniquely specified in a case where the servo pattern is read by two servo signal reading elements.

In addition, as shown in ECMA-319 (June 2001), information (also referred to as "longitudinal position (LPOS) information") indicating the position in the longitudinal direction of the magnetic tape is also generally embedded in each servo band. Similarly to the UDIM information, this LPOS information is also recorded by shifting the position of one pair of servo stripes in the longitudinal direction of the magnetic tape. However, unlike the UDIM information, in a case of this LPOS information, the same signal is recorded in each servo band.

Other information different from the UDIM information and the LPOS information can also be embedded in the servo band. In this case, the embedded information may be different for each servo band, like the UDIM information, or may be common in all of the servo bands, like the LPOS information.

Furthermore, as a method for embedding the information in the servo band, a method other than the aforementioned method can also be used. For example, a predetermined code may be recorded by thinning out a predetermined pair from the group of pairs of the servo stripes.

A servo pattern-forming head is referred to as a servo write head. The servo write head includes pairs of gaps corresponding to the pairs of magnetic stripes, as many as the number of servo bands. In general, a core and a coil are connected to each of the pairs of gaps, and a magnetic field generated in the core can generate a leakage magnetic field in the pairs of gaps, by supplying a current pulse to the coil. In a case of forming the servo pattern, by inputting a current pulse while causing the magnetic tape to run on the servo write head, the magnetic pattern corresponding to the pairs of gaps can be transferred to the magnetic tape to form the servo pattern. A width of each gap can be appropriately set according to a density of the servo pattern to be formed. The width of each gap can be set to, for example, 1 μm or less, 1 to 10 μm, 10 μm or greater, or the like.

Before forming the servo pattern on the magnetic tape, a demagnetization (erasing) process is generally performed on the magnetic tape. This erasing process can be performed by applying a uniform magnetic field to the magnetic tape using a direct current magnet or an alternating current magnet. The erasing process includes direct current (DC) erasing and alternating current (AC) erasing. The AC erasing is performed by gradually reducing a strength of the magnetic field while reversing a direction of the magnetic field applied to the magnetic tape. Meanwhile, the DC erasing is performed by applying a unidirectional magnetic field to the magnetic tape. The DC erasing further includes two methods. A first method is horizontal DC erasing of applying the unidirectional magnetic field along a longitudinal direction of the magnetic tape. A second method is vertical DC erasing of applying the unidirectional magnetic field along a thickness direction of the magnetic tape. The erasing process may be performed on the entire magnetic tape, or may be performed for each servo band of the magnetic tape.

A direction of the magnetic field in the servo pattern to be formed is determined according to the direction of erasing. For example, in a case where the horizontal DC erasing is performed on the magnetic tape, the formation of the servo pattern is performed so that the direction of the magnetic field is opposite to the direction of erasing. Accordingly, the output of the servo signal obtained by the reading of the servo pattern can be increased. Furthermore, as disclosed in JP2012-053940A, in a case where the magnetic pattern is transferred, using the gap, to the magnetic tape subjected to the vertical DC erasing, the servo signal obtained by the reading the formed servo pattern has a unipolar pulse shape. Meanwhile, in a case where the magnetic pattern is transferred, using the gap, to the magnetic tape subjected to the horizontal DC erasing, the servo signal obtained by the reading the formed servo pattern has a bipolar pulse shape.

In the magnetic recording and reproducing device, the recording of data onto the magnetic recording medium and/or the reproducing of the data recorded on the magnetic recording medium can be performed by bringing the surface of the magnetic layer of the magnetic recording medium into contact with the magnetic head and performing sliding.

For example, in a case of recording data onto the magnetic recording medium on which the servo pattern is formed, and/or reproducing the recorded data, first, tracking using a servo signal obtained by reading the servo pattern is performed. That is, by causing the servo signal reading element to follow a predetermined servo track, the element for data is controlled to pass on the target data track. The movement of the data track is performed by changing the servo track to be read by the servo signal reading element, in the tape width direction.

Furthermore, the recording and reproducing head can also perform the recording and/or reproducing with respect to other data bands. In this case, the servo signal reading element may be moved to a predetermined servo band by using the aforementioned UDIM information, and the tracking with respect to the servo band may be started.

In the magnetic recording and reproducing device, the recording of the data onto the magnetic recording medium can be performed at high recording density. The magnetic recording and reproducing device can contribute to achieving better off-track margin characteristics in a case of reproducing data recorded with higher density. The recording density can be, for example, 400 kbpi or higher (for example, in a range of 400 to 800 kbpi) as a linear recording density. The unit kbpi is a unit (cannot be converted into an SI unit system) of a linear recording density.

EXAMPLES

Hereinafter, the present invention will be described with reference to Examples. However, the present invention is not limited to the embodiments shown in Examples. The expressions "parts" and "%" described below indicate "parts by mass" and "% by mass", unless otherwise noted. Moreover, steps and evaluations described below were performed in an environment of an ambient temperature of 23° C.±1° C., unless otherwise noted. Furthermore, "eq" described below indicates an equivalent which is a unit that cannot be converted into the SI unit system.

Ferromagnetic Powder

In Table 1 below, "BaFe" in a column of the kind of the ferromagnetic powder indicates a hexagonal barium ferrite powder having an average particle size (average plate diameter) of 21 nm.

In Table 1, "SrFe1" in the column of the kind of the ferromagnetic powder indicates a hexagonal strontium ferrite powder produced as follows.

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed using a mixer to obtain a raw material mixture.

The obtained raw material mixture was melted in a platinum crucible at a melting temperature of 1,390° C., a tap hole provided on the bottom of the platinum crucible was heated while stirring the molten liquid, and the molten liquid was tapped in a rod shape at approximately 6 g/sec. The tap liquid was rolled and rapidly cooled using a water-cooling twin roller to produce an amorphous body.

An electric furnace was charged with 280 g of the produced amorphous body, heated to 635° C. (crystallization temperature) at a temperature rising rate of 3.5° C./min, and held at the same temperature for 5 hours to precipitate (crystallize) hexagonal strontium ferrite particles.

Next, the crystallized material obtained as described above and including the hexagonal strontium ferrite particles was coarsely pulverized with a mortar, 1,000 g of zirconia beads having a particle diameter of 1 mm and 800 mL of an acetic acid aqueous solution having a concentration of 1% were added to a glass bottle, and a dispersion treatment was performed using a paint shaker for 3 hours. Thereafter, the obtained dispersion liquid was separated from the beads and put in a stainless steel beaker. The dispersion liquid was allowed to stand at a liquid temperature of 100° C. for 3 hours to perform a dissolving treatment of a glass component, then precipitation with a centrifugal separator was performed, decantation was repeated for washing, and drying was performed in a heating furnace having an in-furnace temperature of 110° C. for 6 hours to obtain a hexagonal strontium ferrite powder.

Regarding the hexagonal strontium ferrite powder obtained as described above, an average particle size was 18 nm, an activation volume was 902 $nm^3$, an anisotropy constant Ku was $2.2 \times 10^5$ $J/m^3$, and a mass magnetization σs was 49 $A \cdot m^2/kg$.

12 mg of a sample powder was collected from the hexagonal strontium ferrite powder obtained as described above, the element analysis of a filtrate obtained by partially dissolving this sample powder under the dissolving conditions exemplified above was performed by the ICP analysis device, and a content ratio in the surface layer portion of a neodymium atom was obtained.

Separately, 12 mg of a sample powder was collected from the hexagonal strontium ferrite powder obtained as described above, the element analysis of a filtrate obtained by totally dissolving this sample powder under the dissolving conditions exemplified above was performed by the ICP analysis device, and a bulk content ratio of a neodymium atom was obtained.

The content ratio (bulk content ratio) of the neodymium atom in the hexagonal strontium ferrite powder obtained as described above was 2.9 atom % with respect to 100 atom % of the iron atom. Moreover, the content ratio in the surface layer portion of the neodymium atom was 8.0 atom %. The "content ratio in the surface layer portion/bulk content ratio", which is the ratio of the content ratio in the surface layer portion to the bulk content ratio, was 2.8, and it was confirmed that the neodymium atoms were unevenly distributed on the surface layers of the particles.

The fact in which the powder obtained as described above shows a crystal structure of the hexagonal ferrite was confirmed by performing scanning with CuKα rays under conditions of a voltage of 45 kV and an intensity of 40 mA, and measuring an X-ray diffraction pattern under the following conditions (X-ray diffraction analysis). The powder obtained as described above showed a magnetoplumbite-type (M-type) crystal structure of hexagonal ferrite. Moreover, a crystal phase detected by the X-ray diffraction analysis was a magnetoplumbite-type single phase.

PANalytical X'Pert Pro diffractometer and PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuation
Measurement time per stage: 3 seconds
Measurement speed: 0.017 degrees per second
Measurement step: 0.05 degrees In Table 1, "SrFe2" in the column of the kind of the ferromagnetic powder indicates a hexagonal strontium ferrite powder produced as follows.

1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed and mixed using a mixer to obtain a raw material mixture.

The obtained raw material mixture was melted in a platinum crucible at a melting temperature of 1,380° C., a tap hole provided on the bottom of the platinum crucible was heated while stirring the molten liquid, and the molten liquid was tapped in a rod shape at approximately 6 g/sec. The tap liquid was rolled and rapidly cooled using a water-cooling twin roll to produce an amorphous body.

An electric furnace was charged with 280 g of the obtained amorphous body, heated to 645° C. (crystallization temperature), and held at the same temperature for 5 hours to precipitate (crystallize) hexagonal strontium ferrite particles.

Next, the crystallized material obtained as described above and including the hexagonal strontium ferrite particles was coarsely pulverized with a mortar, 1,000 g of zirconia beads having a particle diameter of 1 mm and 800 mL of an acetic acid aqueous solution having a concentration of 1% were added to a glass bottle, and a dispersion treatment was performed using a paint shaker for 3 hours. Thereafter, the obtained dispersion liquid was separated from the beads and put in a stainless steel beaker. The dispersion liquid was allowed to stand at a liquid temperature of 100° C. for 3 hours to perform a dissolving treatment of a glass component, then precipitation with a centrifugal separator was performed, decantation was repeated for washing, and drying was performed in a heating furnace having an in-furnace temperature of 110° C. for 6 hours to obtain a hexagonal strontium ferrite powder.

Regarding the obtained hexagonal strontium ferrite powder, an average particle size was 19 nm, an activation volume was 1,102 $nm^3$, an anisotropy constant Ku was $2.0 \times 10^5$ $J/m^3$, and a mass magnetization σs was 50 A·$m^2$/kg.

In Table 1, "ε-iron oxide" in the column of the kind of the ferromagnetic powder indicates an ε-iron oxide powder produced as follows.

While stirring, using a magnetic stirrer, a material obtained by dissolving 8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinyl pyrrolidone (PVP) in 90 g of pure water, 4.0 g of an ammonia aqueous solution having a concentration of 25% was added thereto in an air atmosphere under the conditions of an ambient temperature of 25° C., and the mixture was stirred for 2 hours under the same temperature condition of the ambient temperature of 25° C. A citric acid aqueous solution obtained by dissolving 1 g of citric acid in 9 g of pure water was added to the obtained solution, and the mixture was stirred for 1 hour. The powder precipitated after the stirring was collected by centrifugal separation, washed with pure water, and dried in a heating furnace having an in-furnace temperature of 80° C.

800 g of pure water was added to the dried powder, and the powder was dispersed in water again to obtain a dispersion liquid. The obtained dispersion liquid was heated to a liquid temperature of 50° C., and 40 g of an ammonia aqueous solution having a concentration of 25% was added dropwise while stirring. The stirring was performed for 1 hour while holding the temperature of 50° C., then 14 mL of tetraethoxysilane (TEOS) was added dropwise, and the mixture was stirred for 24 hours. 50 g of ammonium sulfate was added to the obtained reaction solution, the precipitated powder was collected by centrifugal separation, washed with pure water, and dried in a heating furnace having an in-furnace temperature of 80° C. for 24 hours to obtain a precursor of a ferromagnetic powder.

The obtained precursor of the ferromagnetic powder was loaded into a heating furnace having an in-furnace temperature of 1,000° C. in an air atmosphere and subjected to a heat treatment for 4 hours.

The heat-treated precursor of the ferromagnetic powder was added into a sodium hydroxide (NaOH) aqueous solution having a concentration of 4 mol/L, the liquid temperature was held at 70° C., stirring was performed for 24 hours, and accordingly, a silicic acid compound as an impurity was removed from the heat-treated precursor of the ferromagnetic powder.

Thereafter, by a centrifugal separation treatment, the ferromagnetic powder from which the silicic acid compound was removed was collected and washed with pure water to obtain the ferromagnetic powder.

The composition of the obtained ferromagnetic powder was confirmed by high-frequency inductively coupled plasma-optical emission spectrometry (ICP-OES), and as a result, the composition was Ga, Co, and Ti substitution-type ε-iron oxide (ε-$Ga_{0.28}Co_{0.05}Ti_{0.05}Fe_{1.62}O_3$). Furthermore, the X-ray diffraction analysis was performed under the same conditions as those disclosed above for the hexagonal strontium ferrite powder SrFe1, and from the peak of the X-ray diffraction pattern, it was confirmed that the obtained ferromagnetic powder has a crystal structure (ε-iron oxide-type crystal structure) of a single phase which is an ε phase not including crystal structures of an α phase and a γ phase.

Regarding the obtained ε-iron oxide powder, an average particle size was 12 nm, an activation volume was 746 $nm^3$, an anisotropy constant Ku was $1.2 \times 10^5$ J/m$^3$, and a mass magnetization σs was 16 A·m$^2$/kg.

The activation volumes and anisotropy constants Ku of the aforementioned hexagonal strontium ferrite powder and ε-iron oxide powder are values obtained for the respective ferromagnetic powders by the aforementioned method using a vibrating sample magnetometer (manufactured by TOEI INDUSTRY CO., LTD.).

Moreover, the mass magnetization σs is a value measured using a vibrating sample magnetometer (manufactured by TOEI INDUSTRY CO., LTD.) at a magnetic field strength of 1,194 kA/m (15 kOe).

Abrasive Solution

Abrasive Solution A

The following components were dispersed for 24 hours with a batch-type ultrasound device (20 kHz and 300 W) to obtain an abrasive solution A.

Alumina abrasive (average particle size: 100 nm): 3.0 parts

Sulfonic acid group-containing polyurethane resin: 0.3 parts
weight-average molecular weight: 70,000, and SO$_3$Na group: 0.3 meq/g Cyclohexanone: 26.7 parts Abrasive Solution B The following components were dispersed for 24 hours with a batch-type ultrasound device (20 kHz and 300 W) to obtain an abrasive solution B.

Diamond abrasive (average particle size: 100 nm): 1.0 part

Sulfonic acid group-containing polyurethane resin: 0.1 parts
weight-average molecular weight: 70,000, and SO$_3$Na group: 0.3 meq/g Cyclohexanone: 26.7 parts Abrasive Solution C With respect to 100.0 parts of an alumina abrasive (average particle size: 100 nm), 3.0 parts of 2,3-dihydroxynaphthalene (produced by Tokyo Chemical Industry Co., Ltd.), 31.3 parts of a solution (the solvent is a mixed solvent of methyl ethyl ketone and toluene) of a 32% polyester polyurethane resin (UR-4800 (amount of a polar group: 80 meq/kg) produced by TOYOBO CO., LTD.) having a SO$_3$Na group as a polar group, and 570.0 parts of a liquid mixture of methyl ethyl ketone and cyclohexanone in a ratio of 1:1 (mass ratio) as a solvent were mixed, and the mixture was dispersed using a paint shaker for 180 minutes (bead dispersion time) in the presence of zirconia beads (bead diameter: 0.1 mm).

After the dispersion, the dispersion liquid was separated from the beads by a mesh, and the obtained dispersion liquid was subjected to a centrifugal separation treatment. The centrifugal separation treatment was performed at a rotation speed of 2,000 rotation per minute (rpm) for 4 minutes using CS150GXL (the rotor used was S100AT6 manufactured by Hitachi Koki Co., Ltd.) manufactured by Hitachi Koki Co., Ltd. as a centrifugal separator. Thereafter, the supernatant liquid was collected by decantation. This collected liquid is referred to as an "abrasive solution C".

Example 1

(1) Formulation of Magnetic Layer-Forming Composition

Magnetic Solution

Ferromagnetic powder (see Table 1): 100.0 parts

SO$_3$Na group-containing polyurethane resin: 14.0 parts
weight-average molecular weight: 70,000, and SO$_3$Na group: 0.4 meq/g Cyclohexanone: 150 parts Methyl ethyl ketone: 150 parts Abrasive Solution See Table 1 (In Table 1, a content described in a column of "Abrasive solution" is a content of the abrasive contained in the abrasive solution with respect to 100.0 parts of the ferromagnetic powder.)

Silica Sol

Colloidal silica (average particle size: 100 nm): 0.2 parts

Methyl ethyl ketone: 1.4 parts

Other Components

Stearic acid: 2.0 parts

Butyl stearate: 10.0 parts

Polyisocyanate (CORONATE produced by Nippon Polyurethane Industry Co., Ltd.): 2.5 parts Cyclohexanone: 200.0 parts Methyl ethyl ketone: 200.0 parts (2) Formulation of Non-Magnetic Layer-Forming Composition Non-magnetic inorganic powder (α-iron oxide): 100.0 parts
average particle size (average long axis length): 10 nm
average aspect ratio: 1.9
Brunauer-Emmett-Teller (BET) specific surface area: 75 m$^2$/g Carbon black: 25.0 parts
average particle size: 20 nm SO$_3$Na group-containing polyurethane resin: 18 parts
weight-average molecular weight: 70,000, and SO$_3$Na group: 0.2 meq/g Stearic acid: 1.0 part Cyclohexanone: 300.0 parts Methyl ethyl ketone: 300.0 parts (3) Formulation of Back Coating Layer-Forming Composition Carbon black: 100.0 parts BP-800 produced by Cabot Corporation, and average particle size: 17 nm SO$_3$Na group-containing polyurethane resin (SO$_3$Na group: 70 eq/ton): 20.0 parts OSO$_3$K group-containing vinyl chloride resin (OSO$_3$K group: 70 eq/ton): 30.0 parts Polyethylene imine (produced by NIPPON SHOKUBAI CO., LTD., and
number-average molecular weight of 600): See Table 1

Stearic acid: See Table 1

Cyclohexanone: 140.0 parts

Methyl ethyl ketone: 170.0 parts

Butyl stearate: 2.0 parts

Stearic acid amide: 0.1 parts (4) Production of Magnetic Tape

The aforementioned components of the magnetic solution were dispersed for 24 hours using a batch-type vertical sand mill to prepare a magnetic solution. As the dispersion beads, zirconia beads having a bead diameter of 0.5 mm were used.

The magnetic solution and the abrasive solution listed in Table 1 were mixed with the silica sol and other components, and then the mixture was subjected to a dispersion treatment for 30 minutes with a batch-type ultrasound device (20 kHz and 300 W). Thereafter, the mixture was filtered with a filter having a pore diameter of 0.5 µm to prepare a magnetic layer-forming composition.

For the non-magnetic layer-forming composition, the aforementioned components were dispersed for 24 hours using a batch-type vertical sand mill. As the dispersion beads, zirconia beads having a bead diameter of 0.1 mm were used. The obtained dispersion liquid was filtered with a filter having a pore diameter of 0.5 µm to prepare a non-magnetic layer-forming composition.

For the back coating layer-forming composition, the aforementioned components were kneaded with a continuous kneader, and then dispersed using a sand mill. After adding 40.0 parts of polyisocyanate (CORONATE L produced by Nippon Polyurethane Industry Co., Ltd.) and 1,000.0 parts of methyl ethyl ketone to the obtained dispersion liquid, the mixture was filtered with a filter having a pore diameter of 1 µm to prepare a back coating layer-forming composition.

The non-magnetic layer-forming composition prepared as described above was applied onto a surface of a support having a thickness of 4.1 µm and made of polyethylene naphthalate so that the thickness after drying was 0.7 µm, and dried to form a non-magnetic layer.

Next, the magnetic layer-forming composition prepared as described above was applied onto the non-magnetic layer so that the thickness after drying was 0.1 µm, to form a coating layer.

Subsequently, while the coating layer formed of the magnetic layer-forming composition was in a wet state, a magnetic field having a magnetic field strength of 0.3 T was applied in the direction perpendicular to the surface of the coating layer to perform a homeotropic alignment treatment, and then the resultant was dried to form a magnetic layer.

Then, the back coating layer-forming composition prepared as described above was applied onto a surface of the support opposite to the surface, on which the non-magnetic layer and the magnetic layer were formed, so that the thickness after drying was 0.3 µm, and dried to form a back coating layer.

Next, a surface smoothing treatment (calender treatment) was performed using a calender roll consisting of a metal roll at a speed of 100 m/min, a linear pressure of 300 kg/cm, and a calender temperature (surface temperature of the calender roll) of 90° C. By doing so, a long magnetic tape original roll was obtained.

Thereafter, a heat treatment was performed for 36 hours in an environment of an ambient temperature of 70° C., and then the long magnetic tape original roll was slit into a width of ½ inches to obtain a magnetic tape. By recording a servo signal on the magnetic layer of the obtained magnetic tape using a commercially available servo writer, a magnetic tape having a servo pattern (timing-based servo pattern) was obtained in an arrangement according to a linear tape-open (LTO) Ultrium format.

It could be confirmed by the following method that the back coating layer of the magnetic tape contains a compound formed of polyethylene imine and stearic acid and having the ammonium salt structure of the alkyl ester anion represented by Formula 1.

A sample was cut out from the magnetic tape, and X-ray photoelectron spectroscopy was performed on the surface (measurement region: 300 µm×700 µm) of the back coating layer using an ESCA device. Specifically, wide scan measurement was performed by the ESCA device under the following measurement conditions. In the measurement results, peaks were confirmed at a position of bond energy of the ester anion and a position of bond energy of the ammonium cation.

Device: AXIS-ULTRA manufactured by Shimadzu Corporation

Excited X-ray source: Monochromatic Al-Kα rays

Scan range: 0 to 1,200 eV

Pass energy: 160 eV

Energy resolution: 1 eV/step

Capturing time: 100 ms/step

Number of times of integration: 5

In addition, a sample piece having a length of 3 cm was cut out from the magnetic tape, attenuated total reflection-fourier transform-infrared spectrometer (ATR-FT-IR) measurement (reflection method) was performed on the surface of the back coating layer, and in the measurement results, absorption was confirmed at a wave number (1,540 $cm^{-1}$ or 1,430 $cm^{-1}$) corresponding to absorption of COO$^-$ and a wave number (2,400 $cm^{-1}$) corresponding to absorption of the ammonium cation.

Evaluation of Off-Track Margin Characteristics

Recording Element and Reproducing Element

A recording element was extracted from a commercially available magnetic head for an LTO drive, and a tip of a first magnetic pole (leading-side magnetic pole) on a write gap side was subjected to trimming processing by ion milling By doing so, a recording element having a tip width W1 of the first magnetic pole of 3.0 µm and a tip width W2 of a second magnetic pole (trailing side) of 3.0 µm was prepared. In Table 1, recording elements described as "With trimming processing" in a column of "Presence or absence of trimming processing" of the recording element are recording elements prepared as described above.

As the reproducing element, TMR elements having the reproducing element widths shown in Table 1 were used.

Evaluation Method

In an environment of an ambient temperature of 23° C.±1° C. and a relative humidity of 50%, the magnetic tape was attached to a ½-inch reel tester to which the magnetic head comprising the recording element and the magnetic head comprising the reproducing element were fixed, a relative speed between the magnetic head and the magnetic tape during recording and reproducing was set to 4 m/sec, and the recording and reproducing of data were performed. The recording was performed at a linear recording density of 600 kbpi, and for the recording pattern, a pseudo-random binary sequence having periods of 63 bits and 127 bits was used. Specifically, the recording was performed as follows. First, a pseudo-random binary sequence having a period of 63 bits was recorded on a first track, then the magnetic head comprising the recording element was shifted by 1.0 µm in a tape width direction, and a pseudo-random binary sequence having a period of 127 bits was recorded as a second track so as to partially overwrite the first track.

Next, a bit error rate was obtained by disposing the magnetic head comprising the reproducing element at a track center of the first track to perform reproduction, and restoring the original recording sequence from a reproduction signal during the reproduction. Thereafter, the magnetic head comprising the reproducing element was gradually moved from the track center of the first track toward the second track in the tape width direction, and a bit error rate of the reproduction signal at each reproduction position was evaluated. As the reproducing head was moved from the center of the first track toward the second track, the bit error rate was increased. A maximum distance between the reproducing head and the center of the first track, which could secure a bit error rate of $1 \times 10^{-4}$ or less, was obtained as an "off-track margin". In a case where the off-track margin obtained as described above was 100 nm or greater, it could be evaluated that favorable off-track margin characteristics, which could also meet stricter needs expected with further higher-density recording in the future, were achieved. In Table 1 below, "Unevaluable" means that the magnetic tape was stuck to the magnetic head and thus could not be run.

Examples 2 to 54 and Comparative Examples 1 to 42

Production of magnetic tapes and evaluations of off-track margin characteristics were performed in the same manner as in Example 1, except that various items were changed as shown in Table 1 (Table 1-1 to Table 1-4). In Table 1, recording elements described as "None" in the column of "Presence or absence of trimming processing" of the recording element are recording elements extracted from commercially available magnetic heads for an LTO drive, and were used for evaluations of the off-track margin characteristics without performing the aforementioned trimming processing. In the recording elements, the tip width W1 of the first magnetic pole was 41.0 μm, and the tip width W2 of the second magnetic pole (trailing side) was 3.0 μm.

Evaluation of Physical Properties of Magnetic Tape

Physical properties of each magnetic tape of Examples and Comparative Examples were evaluated by the following methods.

Number of Recesses (Per Area of 40 μm×40 μm) Present in Surface of Magnetic Layer and Having Equivalent Circle Diameter of 0.20 μm to 0.50 μm The following conditions were used as the measurement conditions for the AFM, and the number of recesses (per area of 40 μm×40 μm) having an equivalent circle diameter within the above range in the surface of the magnetic layer of each magnetic tape of Examples and Comparative Examples was obtained by the aforementioned method.

A region having an area of 40 μm×40 μm on the surface of the magnetic layer of the magnetic recording medium was measured by using an AFM (Nanoscope 5 manufactured by BRUKER) in a peak force tapping mode. SCANASYST-AIR manufactured by BRUKER was used as a probe, a resolution was set to 512 pixels×512 pixels, and a scan speed was set to a speed at which one screen (512 pixels×512 pixels) was measured for 512 seconds.

Number of Bright Regions Having Equivalent Circle Diameter of 100 nm or Greater and Less Than 150 nm FE-SEM 54800 manufactured by Hitachi, Ltd. was used as the scanning electron microscope (FE-SEM), and the number of bright regions having an equivalent circle diameter of 100 nm or greater and less than 150 nm on the surface of the magnetic layer of each magnetic tape of Examples and Comparative Examples was obtained by the following method.

A secondary electron image of the surface of the magnetic layer of the magnetic tape to be measured was captured using the scanning electron microscope (FE-SEM). As imaging conditions, an acceleration voltage was set to 5 kV, a working distance was set to 5 mm, and an imaging magnification was set to 10,000 times. In a case of performing the imaging, an unimaged region on the surface of the magnetic layer was selected, focus adjustment was performed under the aforementioned imaging conditions, and a secondary electron image was captured. A portion (micron bar, cross mark, and the like) displaying a size and the like was erased from the captured image, and a secondary electron image having the number of pixels of 960 pixels× 1,280 pixels was acquired.

The aforementioned operations were performed 100 times at different spots on the surface of the magnetic layer of the magnetic tape to be measured.

The secondary electron images acquired as described above were taken into image processing software (free software ImageJ), and subjected to a binarization process according to the following procedure.

The threshold value for performing the binarization process on the secondary electron image acquired as described above was set to 210 gradations for a lower limit value and 255 gradations for an upper limit value, and the binarization process was executed by these two threshold values. After the binarization process, in the image analysis software (free software ImageJ), a noise cut process Despeckle was selected to remove noise components.

Regarding the binarized image obtained as described above, the number of bright regions (that is, white portions) and the area of each bright region were obtained by the image analysis software (free software ImageJ). From an area A of the bright region obtained here, an equivalent circle diameter L of each bright region was calculated by $(A/\pi)\bigcirc(\frac{1}{2})\times 2=L$.

The aforementioned steps were performed on the binarized images (100 images) obtained as described above.

Accordingly, the number of bright regions (the total number of bright regions in 100 images) having an equivalent circle diameter of 100 nm or greater and less than 150 nm was obtained.

Total Thickness (Tape Thickness) of Magnetic Tape

Ten tape samples (having a length of 5 cm) were cut out from any portion of the magnetic tape, these tape samples were stacked, and a thickness thereof was measured. The thickness was measured using digital thickness meters such as Millimar 1240 COMPACT AMPLIFIER and Millimar 1301 INDUCTIVE PROBE manufactured by Mahr Inc. A value (thickness per tape sample) obtained by taking the measured thickness by ¹/₁₀ was taken as a tape thickness. The tape thickness of each magnetic tape was 5.2 μm.

The above results are shown in Table 1.

TABLE 1

| | Ferromagnetic powder Kind | Back coating layer-forming composition | | Abrasive solution | | | Magnetic layer | | Recording element Presence or absence of trimming processing | Reproducing element Reproducing element width (μm) | Off-track margin (nm) |
|---|---|---|---|---|---|---|---|---|---|---|---|
| | | Polyethyleneimine | Stearic acid | A | B | C | Number of recesses having equivalent circle diameter of 0.20 μm to 0.50 μm (per area of 40 μm × 40 μm) | Number of bright regions having equivalent circle diameter of 100 nm or greater and less than 150 nm | | | |
| Example 1 | BaFe | 0.2 parts | 0.4 parts | 3.0 parts | 1.0 part | 0.0 parts | 500 | 10000 | With trimming processing | 0.8 | 100 |
| Example 2 | BaFe | 0.2 parts | 0.4 parts | 3.0 parts | 1.0 part | 0.0 parts | 500 | 10000 | With trimming processing | 0.7 | 150 |
| Example 3 | BaFe | 0.2 parts | 0.4 parts | 3.0 parts | 1.0 part | 0.0 parts | 500 | 10000 | With trimming processing | 0.6 | 200 |
| Example 4 | BaFe | 0.2 parts | 0.4 parts | 3.0 parts | 1.0 part | 0.0 parts | 500 | 10000 | With trimming processing | 0.5 | 250 |
| Example 5 | BaFe | 0.3 parts | 0.5 parts | 3.0 parts | 1.0 part | 0.0 parts | 400 | 10000 | With trimming processing | 0.8 | 100 |
| Example 6 | BaFe | 0.3 parts | 0.5 parts | 3.0 parts | 1.0 part | 0.0 parts | 400 | 10000 | With trimming processing | 0.7 | 150 |
| Example 7 | BaFe | 0.3 parts | 0.5 parts | 3.0 parts | 1.0 part | 0.0 parts | 400 | 10000 | With trimming processing | 0.6 | 200 |
| Example 8 | BaFe | 0.3 parts | 0.5 parts | 3.0 parts | 1.0 part | 0.0 parts | 400 | 10000 | With trimming processing | 0.5 | 250 |
| Example 9 | BaFe | 0.3 parts | 0.7 parts | 3.0 parts | 1.0 part | 0.0 parts | 300 | 10000 | With trimming processing | 0.8 | 150 |
| Example 10 | BaFe | 0.3 parts | 0.7 parts | 3.0 parts | 1.0 part | 0.0 parts | 300 | 10000 | With trimming processing | 0.7 | 200 |
| Example 11 | BaFe | 0.3 parts | 0.7 parts | 3.0 parts | 1.0 part | 0.0 parts | 300 | 10000 | With trimming processing | 0.6 | 300 |
| Example 12 | BaFe | 0.3 parts | 0.7 parts | 3.0 parts | 1.0 part | 0.0 parts | 300 | 10000 | With trimming processing | 0.5 | 400 |
| Example 13 | BaFe | 0.5 parts | 1.0 part | 3.0 parts | 1.0 part | 0.0 parts | 200 | 10000 | With trimming processing | 0.8 | 150 |
| Example 14 | BaFe | 0.5 parts | 1.0 part | 3.0 parts | 1.0 part | 0.0 parts | 200 | 10000 | With trimming processing | 0.7 | 200 |
| Example 15 | BaFe | 0.5 parts | 1.0 part | 3.0 parts | 1.0 part | 0.0 parts | 200 | 10000 | With trimming processing | 0.6 | 300 |
| Example 16 | BaFe | 0.5 parts | 1.0 part | 3.0 parts | 1.0 part | 0.0 parts | 200 | 10000 | With trimming processing | 0.5 | 400 |
| Example 17 | BaFe | 1.0 part | 2.0 parts | 3.0 parts | 1.0 part | 0.0 parts | 100 | 10000 | With trimming processing | 0.8 | 100 |
| Example 18 | BaFe | 1.0 part | 2.0 parts | 3.0 parts | 1.0 part | 0.0 parts | 100 | 10000 | With trimming processing | 0.7 | 150 |
| Example 19 | BaFe | 1.0 part | 2.0 parts | 3.0 parts | 1.0 part | 0.0 parts | 100 | 10000 | With trimming processing | 0.6 | 200 |
| Example 20 | BaFe | 1.0 part | 2.0 parts | 3.0 parts | 1.0 part | 0.0 parts | 100 | 10000 | With trimming processing | 0.5 | 250 |
| Example 21 | BaFe | 2.7 parts | 5.3 parts | 3.0 parts | 1.0 part | 0.0 parts | 10 | 10000 | With trimming processing | 0.8 | 100 |
| Example 22 | BaFe | 2.7 parts | 5.3 parts | 3.0 parts | 1.0 part | 0.0 parts | 10 | 10000 | With trimming processing | 0.7 | 150 |
| Example 23 | BaFe | 2.7 parts | 5.3 parts | 3.0 parts | 1.0 part | 0.0 parts | 10 | 10000 | With trimming processing | 0.6 | 200 |
| Example 24 | BaFe | 2.7 parts | 5.3 parts | 3.0 parts | 1.0 part | 0.0 parts | 10 | 10000 | With trimming processing | 0.5 | 250 |
| Example 25 | SrFe1 | 0.2 parts | 0.4 parts | 3.0 parts | 1.0 part | 0.0 parts | 500 | 10000 | With trimming processing | 0.8 | 100 |
| Example 26 | SrFe2 | 0.2 parts | 0.4 parts | 3.0 parts | 1.0 part | 0.0 parts | 500 | 10000 | With trimming processing | 0.8 | 100 |
| Example 27 | ε-Iron oxide | 0.2 parts | 0.4 parts | 3.0 parts | 1.0 part | 0.0 parts | 5001 | 10000 | With trimming processing | 0.8 | 100 |
| Example 28 | BaFe | 0.2 parts | 0.4 parts | 0.0 parts | 0.0 parts | 5.0 parts | 500 | 5000 | With trimming processing | 0.8 | 500 |
| Example 29 | BaFe | 0.2 parts | 0.4 parts | 0.0 parts | 0.0 parts | 5.0 parts | 500 | 5000 | With trimming processing | 0.7 | 540 |

TABLE 1-continued

| | | Back coating layer-forming composition | | | | | Magnetic layer | | | | |
|---|---|---|---|---|---|---|---|---|---|---|---|
| | Ferro-magnetic powder Kind | Poly-ethylene-imine | Stearic acid | Abrasive solution A | B | C | Number of recesses having equivalent circle diameter of 0.20 μm to 0.50 μm (per area of 40 μm × 40 μm) | Number of bright regions having equivalent circle diameter of 100 nm or greater and less than 150 nm | Recording element Presence or absence of trimming processing | Repro-ducing element Repro-ducing element width (μm) | Off-track margin (nm) |
| Example 30 | BaFe | 0.2 parts | 0.4 parts | 0.0 parts | 0.0 parts | 5.0 parts | 500 | 5000 | With trimming processing | 0.6 | 580 |
| Example 31 | BaFe | 0.2 parts | 0.4 parts | 0.0 parts | 0.0 parts | 5.0 parts | 500 | 5000 | With trimming processing | 0.5 | 600 |
| Example 32 | BaFe | 0.3 parts | 0.5 parts | 0.0 parts | 0.0 parts | 5.0 parts | 400 | 5000 | With trimming processing | 0.8 | 520 |
| Example 33 | BaFe | 0.3 parts | 0.5 parts | 0.0 parts | 0.0 parts | 4.0 parts | 400 | 4000 | With trimming processing | 0.8 | 540 |
| Example 34 | BaFe | 0.3 parts | 0.5 parts | 0.0 parts | 0.0 parts | 2.0 parts | 400 | 2000 | With trimming processing | 0.8 | 560 |
| Example 35 | BaFe | 0.3 parts | 0.5 parts | 0.0 parts | 0.0 parts | 1.0 part | 400 | 1000 | With trimming processing | 0.8 | 570 |
| Example 36 | BaFe | 0.3 parts | 0.7 parts | 0.0 parts | 0.0 parts | 5.0 parts | 300 | 5000 | With trimming processing | 0.8 | 590 |
| Example 37 | BaFe | 0.3 parts | 0.7 parts | 0.0 parts | 0.0 parts | 3.0 parts | 300 | 3000 | With trimming processing | 0.8 | 600 |
| Example 38 | BaFe | 0.3 parts | 0.7 parts | 0.0 parts | 0.0 parts | 3.0 parts | 300 | 3000 | With trimming processing | 0.7 | 640 |
| Example 39 | BaFe | 0.3 parts | 0.7 parts | 0.0 parts | 0.0 parts | 3.0 parts | 300 | 3000 | With trimming processing | 0.6 | 680 |
| Example 40 | BaFe | 0.5 parts | 1.0 part | 0.0 parts | 0.0 parts | 3.0 parts | 300 | 3000 | With trimming processing | 0.5 | 700 |
| Example 41 | BaFe | 0.5 parts | 1.0 part | 0.0 parts | 0.0 parts | 1.0 part | 300 | 1000 | With trimming processing | 0.8 | 550 |
| Example 42 | BaFe | 0.5 parts | 1.0 part | 0.0 parts | 0.0 parts | 1.0 part | 300 | 1000 | With trimming processing | 0.7 | 590 |
| Example 43 | BaFe | 0.5 parts | 1.0 part | 0.0 parts | 0.0 parts | 1.0 part | 300 | 1000 | With trimming processing | 0.5 | 610 |
| Example 44 | BaFe | 1.0 part | 2.0 parts | 0.0 parts | 0.0 parts | 5.0 parts | 100 | 5000 | With trimming processing | 0.8 | 500 |
| Example 45 | BaFe | 1.0 part | 2.0 parts | 0.0 parts | 0.0 parts | 3.0 parts | 100 | 3000 | With trimming processing | 0.8 | 600 |
| Example 46 | BaFe | 1.0 part | 2.0 parts | 0.0 parts | 0.0 parts | 2.0 parts | 100 | 2000 | With trimming processing | 0.8 | 620 |
| Example 47 | BaFe | 1.0 part | 2.0 parts | 0.0 parts | 0.0 parts | 1.0 part | 100 | 1000 | With trimming processing | 0.8 | 650 |
| Example 48 | BaFe | 2.7 parts | 5.3 parts | 0.0 parts | 0.0 parts | 1.0 part | 10 | 1000 | With trimming processing | 0.8 | 500 |
| Example 49 | BaFe | 2.7 parts | 5.3 parts | 0.0 parts | 0.0 parts | 3.0 parts | 10 | 3000 | With trimming processing | 0.7 | 530 |
| Example 50 | BaFe | 2.7 parts | 5.3 parts | 0.0 parts | 0.0 parts | 3.0 parts | 10 | 3000 | With trimming processing | 0.6 | 550 |
| Example 51 | BaFe | 2.7 parts | 5.3 parts | 0.0 parts | 0.0 parts | 3.0 parts | 10 | 3000 | With trimming processing | 0.5 | 550 |
| Example 52 | SrFe1 | 0.2 parts | 0.4 parts | 0.0 parts | 0.0 parts | 3.0 parts | 500 | 3000 | With trimming processing | 0.8 | 500 |
| Example 53 | SrFe2 | 0.2 parts | 0.4 parts | 0.0 parts | 0.0 parts | 3.0 parts | 500 | 3000 | With trimming processing | 0.8 | 500 |
| Example 54 | ε-Iron oxide | 0.2 parts | 0.4 parts | 0.0 parts | 0.0 parts | 3.0 parts | 500 | 3000 | With trimming processing | 0.8 | 500 |
| Comparative Example 1 | BaFe | 0.0 parts | 0.0 parts | 3.0 parts | 1.0 part | 0.0 parts | 2000 | 10000 | None | 1.0 | 0 |
| Comparative Example 2 | BaFe | 0.0 parts | 0.1 parts | 3.0 parts | 1.0 part | 0.0 parts | 1500 | 10000 | None | 1.0 | 0 |
| Comparative Example 3 | BaFe | 0.1 parts | 0.1 parts | 3.0 parts | 1.0 part | 0.0 parts | 1000 | 10000 | None | 1.0 | 0 |
| Comparative Example 4 | BaFe | 0.2 parts | 0.4 parts | 3.0 parts | 1.0 part | 0.0 parts | 700 | 10000 | None | 1.0 | 0 |
| Comparative Example 5 | BaFe | 0.3 parts | 0.5 parts | 3.0 parts | 1.0 part | 0.0 parts | 400 | 10000 | None | 1.0 | 0 |

TABLE 1-continued

|  | Ferromagnetic powder Kind | Back coating layer-forming composition | | Abrasive solution | | | Magnetic layer | | Recording element Presence or absence of trimming processing | Reproducing element Reproducing element width (μm) | Off-track margin (nm) |
|---|---|---|---|---|---|---|---|---|---|---|---|
|  |  | Polyethyleneimine | Stearic acid | A | B | C | Number of recesses having equivalent circle diameter of 0.20 μm to 0.50 μm (per area of 40 μm × 40 μm) | Number of bright regions having equivalent circle diameter of 100 nm or greater and less than 150 nm |  |  |  |
| Comparative Example 6 | BaFe | 0.5 parts | 1.0 part | 3.0 parts | 1.0 part | 0.0 parts | 200 | 10000 | None | 1.0 | 0 |
| Comparative Example 7 | BaFe | 4.0 parts | 8.0 parts | 3.0 parts | 1.0 part | 0.0 parts | 5 | 10000 | None | 1.0 | Unevaluable |
| Comparative Example 8 | BaFe | 5.3 parts | 10.7 parts | 3.0 parts | 1.0 part | 0.0 parts | 3 | 10000 | None | 1.0 | Unevaluable |
| Comparative Example 9 | BaFe | 0.0 parts | 0.0 parts | 3.0 parts | 1.0 part | 0.0 parts | 2000 | 10000 | With trimming processing | 1.0 | 30 |
| Comparative Example 10 | BaFe | 0.0 parts | 0.1 parts | 3.0 parts | 1.0 part | 0.0 parts | 1500 | 10000 | With trimming processing | 1.0 | 30 |
| Comparative Example 11 | BaFe | 0.1 parts | 0.1 parts | 3.0 parts | 1.0 part | 0.0 parts | 1000 | 10000 | With trimming processing | 1.0 | 30 |
| Comparative Example 12 | BaFe | 0.2 parts | 0.4 parts | 3.0 parts | 1.0 part | 0.0 parts | 700 | 10000 | With trimming processing | 1.0 | 30 |
| Comparative Example 13 | BaFe | 0.3 parts | 0.5 parts | 3.0 parts | 1.0 part | 0.0 parts | 400 | 10000 | With trimming processing | 1.0 | 30 |
| Comparative Example 14 | BaFe | 0.5 parts | 1.0 part | 3.0 parts | 1.0 part | 0.0 parts | 200 | 10000 | With trimming processing | 1.0 | 30 |
| Comparative Example 15 | BaFe | 4.0 parts | 8.0 parts | 3.0 parts | 1.0 part | 0.0 parts | 5 | 10000 | With trimming processing | 1.0 | 30 |
| Comparative Example 16 | BaFe | 5.3 parts | 10.7 parts | 3.0 parts | 1.0 part | 0.0 parts | 3 | 10000 | With trimming processing | 1.0 | Unevaluable |
| Comparative Example 17 | BaFe | 0.0 parts | 0.0 parts | 3.0 parts | 1.0 part | 0.0 parts | 2000 | 10000 | With trimming processing | 0.8 | 30 |
| Comparative Example 18 | BaFe | 0.0 parts | 0.1 parts | 3.0 parts | 1.0 part | 0.0 parts | 1500 | 10000 | With trimming processing | 0.8 | 30 |
| Comparative Example 19 | BaFe | 0.1 parts | 0.1 parts | 3.0 parts | 1.0 part | 0.0 parts | 1000 | 10000 | With trimming processing | 0.8 | 30 |
| Comparative Example 20 | BaFe | 0.1 parts | 0.3 parts | 3.0 parts | 1.0 part | 0.0 parts | 700 | 10000 | With trimming processing | 0.8 | 30 |
| Comparative Example 21 | BaFe | 4.0 parts | 8.0 parts | 3.0 parts | 1.0 part | 0.0 parts | 5 | 10000 | With trimming processing | 0.8 | 30 |
| Comparative Example 22 | BaFe | 5.3 parts | 10.7 parts | 3.0 parts | 1.0 part | 0.0 parts | 3 | 10000 | With trimming processing | 0.8 | Unevaluable |
| Comparative Example 23 | BaFe | 0.0 parts | 0.0 parts | 3.0 parts | 1.0 part | 0.0 parts | 2000 | 10000 | With trimming processing | 0.6 | 30 |
| Comparative Example 24 | BaFe | 0.0 parts | 0.1 parts | 3.0 parts | 1.0 part | 0.0 parts | 1500 | 10000 | With trimming processing | 0.6 | 30 |
| Comparative Example 25 | BaFe | 0.1 parts | 0.1 parts | 3.0 parts | 1.0 part | 0.0 parts | 1000 | 10000 | With trimming processing | 0.6 | 40 |
| Comparative Example 26 | BaFe | 0.1 parts | 0.3 parts | 3.0 parts | 1.0 part | 0.0 parts | 700 | 10000 | With trimming processing | 0.6 | 40 |
| Comparative Example 27 | BaFe | 4.0 parts | 8.0 parts | 3.0 parts | 1.0 part | 0.0 parts | 5 | 10000 | With trimming processing | 0.6 | 30 |
| Comparative Example 28 | BaFe | 5.3 parts | 10.7 parts | 3.0 parts | 1.0 part | 0.0 parts | 3 | 10000 | With trimming processing | 0.6 | Unevaluable |
| Comparative Example 29 | BaFe | 0.0 parts | 0.0 parts | 3.0 parts | 1.0 part | 0.0 parts | 2000 | 10000 | With trimming processing | 0.5 | 30 |
| Comparative Example 30 | BaFe | 0.0 parts | 0.1 parts | 3.0 parts | 1.0 part | 0.0 parts | 1500 | 10000 | With trimming processing | 0.5 | 30 |
| Comparative Example 31 | BaFe | 0.1 parts | 0.1 parts | 3.0 parts | 1.0 part | 0.0 parts | 1000 | 10000 | With trimming processing | 0.5 | 50 |
| Comparative Example 32 | BaFe | 0.1 parts | 0.3 parts | 3.0 parts | 1.0 part | 0.0 parts | 700 | 10000 | With trimming processing | 0.5 | 40 |
| Comparative Example 33 | BaFe | 4.0 parts | 8.0 parts | 3.0 parts | 1.0 part | 0.0 parts | 5 | 10000 | With trimming processing | 0.5 | 30 |
| Comparative Example 34 | BaFe | 5.3 parts | 10.7 parts | 3.0 parts | 1.0 part | 0.0 parts | 3 | 10000 | With trimming processing | 0.5 | Unevaluable |
| Comparative Example 35 | BaFe | 0.3 parts | 0.7 parts | 3.0 parts | 1.0 part | 0.0 parts | 300 | 10000 | With trimming processing | 0.4 | 50 |

TABLE 1-continued

| | | Back coating layer-forming composition | | | | | Magnetic layer | | | | |
|---|---|---|---|---|---|---|---|---|---|---|---|
| | Ferro-mag-netic powder | Poly-ethylene-imine | Stearic acid | Abrasive solution | | | Number of recesses having equivalent circle diameter of 0.20 µm to 0.50 µm (per area of 40 µm × 40 µm) | Number of bright regions having equivalent circle diameter of 100 nm or greater and less than 150 nm | Recording element Presence or absence of trimming processing | Repro-ducing element Repro-ducing element width (µm) | Off-track margin (nm) |
| | Kind | | | A | B | C | | | | | |
| Comparative Example 36 | BaFe | 0.3 parts | 0.7 parts | 3.0 parts | 1.0 part | 0.0 parts | 300 | 10000 | With trimming processing | 0.3 | 50 |
| Comparative Example 37 | BaFe | 0.0 parts | 0.0 parts | 3.0 parts | 1.0 part | 0.0 parts | 2000 | 10000 | None | 0.8 | 30 |
| Comparative Example 38 | BaFe | 0.0 parts | 0.1 parts | 3.0 parts | 1.0 part | 0.0 parts | 1500 | 10000 | None | 0.8 | 30 |
| Comparative Example 39 | BaFe | 0.1 parts | 0.1 parts | 3.0 parts | 1.0 part | 0.0 parts | 1000 | 10000 | None | 0.8 | 30 |
| Comparative Example 40 | BaFe | 0.1 parts | 0.3 parts | 3.0 parts | 1.0 part | 0.0 parts | 700 | 10000 | None | 0.8 | 30 |
| Comparative Example 41 | BaFe | 4.0 parts | 8.0 parts | 3.0 parts | 1.0 part | 0.0 parts | 5 | 10000 | None | 0.8 | Unevaluable |
| Comparative Example 42 | BaFe | 5.3 parts | 10.7 parts | 3.0 parts | 1.0 part | 0.0 parts | 3 | 10000 | None | 0.8 | Unevaluable |

The magnetic tapes were produced by the same method as in Example 1, except that the homeotropic alignment treatment was not performed in a case of producing the magnetic tapes.

A sample piece was cut out from each of the magnetic tape. For this sample piece, a squareness ratio in a vertical direction was obtained by the aforementioned method using a TM-TRVSM5050-SMSL type manufactured by TAMAKAWA CO., LTD. as the vibrating sample magnetometer, and as a result, the squareness ratio was 0.55.

For the sample piece cut out from the magnetic tape of Example 1, a squareness ratio in a vertical direction was obtained in the same manner as above, and as a result, the squareness ratio was 0.60.

The two magnetic tapes were each attached to a ½-inch reel tester, and electromagnetic conversion characteristics (SNR; signal-to-noise ratio) thereof were evaluated by the following method. As a result, for the magnetic tape of Example 1, an SNR value higher by 2 dB than that of the magnetic tape produced without the homeotropic alignment treatment was obtained.

In an environment of a temperature of 23° C. and a relative humidity of 50%, a tension of 0.7 N was applied in the longitudinal direction of the magnetic tape, and the recording and the reproducing were performed for 10 passes. A relative speed between the magnetic tape and the magnetic head was set to 6 msec, and the recording was performed by using a metal-in-gap (MIG) head (gap length of 0.15 µm and track width of 1.0 µm) as a recording head, and setting a recording current to the optimum recording current of each magnetic tape. The reproducing was performed using a giant-magnetoresistive (GMR) head (element thickness of 15 nm, shield interval of 0.1 µm, and reproducing element width of 0.8 µm) as a reproducing head. A signal having a linear recording density of 300 kfci was recorded, and the reproduction signal was measured using a spectrum analyzer manufactured by Shibasoku Co., Ltd. The unit kfci is a unit (cannot be converted into the SI unit system) of a linear recording density. For the signal, a portion in which the signal was sufficiently stable after the start of magnetic tape running was used.

The embodiment of the present invention is useful in the technical field of a magnetic recording medium for high-density recording.

What is claimed is:

1. A magnetic recording and reproducing device comprising:
    a magnetic recording medium;
    a recording element; and
    a reproducing element,
    wherein the recording element is an inductive recording element having a first magnetic pole which generates a magnetic field, and a second magnetic pole which is spaced apart from the first magnetic pole with a write gap interposed therebetween,
    a tip width of the first magnetic pole is substantially the same as a tip width of the second magnetic pole,
    a reproducing element width of the reproducing element is 0.5 µm to 0.8 µm,
    the magnetic recording medium has a non-magnetic support, and a magnetic layer containing a ferromagnetic powder, and
    the number of recesses, which are present in a surface of the magnetic layer and have an equivalent circle diameter of 0.20 µm to 0.50 µm, is 10 to 500 per area of 40 µm×40 µm.

2. The magnetic recording and reproducing device according to claim 1,
    wherein the number of bright regions having an equivalent circle diameter of 100 nm or greater and less than 150 nm is 1,000 to 5,000 in a binarized image of a secondary electron image obtained by imaging the surface of the magnetic layer with a scanning electron microscope at an acceleration voltage of 5 kV.

3. The magnetic recording and reproducing device according to claim 1,
wherein a total thickness of the magnetic recording medium is 5.2 μm or less.

4. The magnetic recording and reproducing device according to claim 2,
wherein a total thickness of the magnetic recording medium is 5.2 μm or less.

5. The magnetic recording and reproducing device according to claim 1,
wherein the magnetic recording medium further has a non-magnetic layer which contains a non-magnetic powder and is provided between the non-magnetic support and the magnetic layer.

6. The magnetic recording and reproducing device according to claim 1,
wherein the magnetic recording medium further has a back coating layer which contains a non-magnetic powder and is provided on a surface side of the non-magnetic support opposite to a surface side on which the magnetic layer is provided.

7. The magnetic recording and reproducing device according to claim 6,
wherein the non-magnetic powder of the back coating layer includes carbon black.

8. The magnetic recording and reproducing device according to claim 1,
wherein the ferromagnetic powder is a hexagonal barium ferrite powder.

9. The magnetic recording and reproducing device according to claim 1,
wherein the ferromagnetic powder is a hexagonal strontium ferrite powder.

10. The magnetic recording and reproducing device according to claim 1,
wherein the ferromagnetic powder is an ε-iron oxide powder.

11. The magnetic recording and reproducing device according to claim 1,
wherein the magnetic recording medium is a magnetic tape.

* * * * *